US011523072B2

(12) United States Patent
Arishima et al.

(10) Patent No.: US 11,523,072 B2
(45) Date of Patent: Dec. 6, 2022

(54) PHOTOELECTRIC CONVERSION APPARATUS, PHOTOELECTRIC CONVERSION SYSTEM, AND TRANSPORTATION EQUIPMENT

(71) Applicant: CANON KABUSHIKI KAISHA, Tokyo (JP)

(72) Inventors: Yu Arishima, Kanagawa (JP); Kazuhiro Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/103,195

(22) Filed: Nov. 24, 2020

(65) Prior Publication Data

US 2021/0168309 A1 Jun. 3, 2021

(30) Foreign Application Priority Data

Nov. 29, 2019 (JP) ............................ JP2019-217502

(51) Int. Cl.
*H04N 5/355* (2011.01)
*H04N 7/18* (2006.01)
*H04N 5/378* (2011.01)

(52) U.S. Cl.
CPC ............. *H04N 5/355* (2013.01); *H04N 5/378* (2013.01); *H04N 7/18* (2013.01)

(58) Field of Classification Search
CPC .......... H04N 5/355; H04N 5/378; H04N 7/18; H04N 5/3598; H04N 7/183
See application file for complete search history.

(56) References Cited

U.S. PATENT DOCUMENTS

2006/0177099 A1* 8/2006 Zhu ........................ G06V 20/10 382/104
2011/0149135 A1 6/2011 Yamanaka
2011/0292264 A1* 12/2011 Kubo .................. H04N 5/3742 348/294

FOREIGN PATENT DOCUMENTS

JP 2008-067344 A 3/2008
JP 2010-187317 A 8/2010
JP 2011-029734 A 2/2011
WO 2010/023903 A1 3/2010

* cited by examiner

*Primary Examiner* — Michael E Teitelbaum
(74) *Attorney, Agent, or Firm* — Canon U.S.A., Inc. IP Division

(57) ABSTRACT

A photoelectric converter includes pixels, vertical output lines to which a signal is outputted from the pixels, clippers configured to limit a potential of the output lines and a controller. Each of the clippers includes a first circuit configured to output an amplification signal according to a predetermined potential and the potential of the output line and a second circuit configured to supply a current according to the amplification signal to the output line. The controller controls each of the clippers to a state selected from states including a first state in which a range in which the potential of the output line can change is limited using the first and second circuits, and a second state in which the range in which the potential of the vertical output line can change is limited with an output of the second circuit deactivated.

20 Claims, 15 Drawing Sheets

109
VDD
VCLIPL
214
VB
VCLIPH
212
211
209
215
216
210
213
207
208
VDD
101
VDD
RES
TX
SEL
201
202
203
204
205
206
105
110

109
VCLIPH
VCLIPL
VB
212
211
209
215
216
VDD
210
213
101
VDD
RES
SEL
201
202
203
204
205
206
105
110

109
VDD
VB
VCLIPH
VCLIPL
400
212
211
209
215
216
VDD
210
213
101
VDD
RES
SEL
205
204
206
203
202
201
105
110

1200
1203 1201
APERTURE STOP
1202
100
IMAGE CAPTURING APPARATUS
1204
SIGNAL PROCESSOR
1205
BUFFER MEMORY
COMPUTER
EXTERNAL I/F
1206
1210
TIMING GENERATOR
CENTRAL CONTROLLER/ PROCESSOR
1209
RECORDING MEDIUM CONTROL I/F
1208
RECORDING MEDIUM
1207

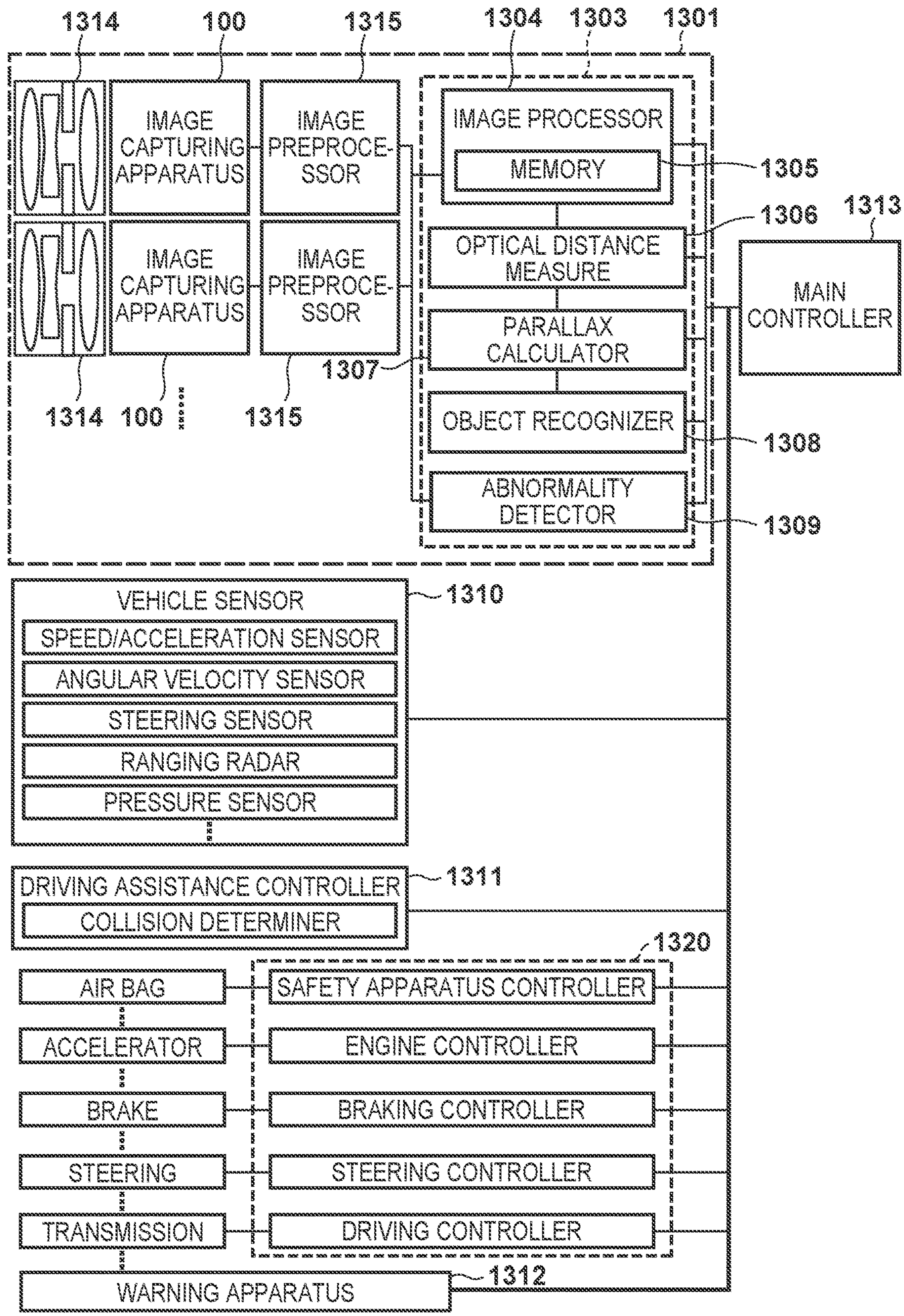

FIG. 13A
1314
100
1315
1304
1303
1301
IMAGE CAPTURING APPARATUS
IMAGE PREPROCESSOR
IMAGE PROCESSOR
MEMORY
1305
IMAGE CAPTURING APPARATUS
IMAGE PREPROCESSOR
OPTICAL DISTANCE MEASURE
1306
1313
MAIN CONTROLLER
PARALLAX CALCULATOR
1307
1314
100
1315
OBJECT RECOGNIZER
1308
ABNORMALITY DETECTOR
1309
VEHICLE SENSOR
1310
SPEED/ACCELERATION SENSOR
ANGULAR VELOCITY SENSOR
STEERING SENSOR
RANGING RADAR
PRESSURE SENSOR
DRIVING ASSISTANCE CONTROLLER
1311
COLLISION DETERMINER
1320
AIR BAG
SAFETY APPARATUS CONTROLLER
ACCELERATOR
ENGINE CONTROLLER
BRAKE
BRAKING CONTROLLER
STEERING
STEERING CONTROLLER
TRANSMISSION
DRIVING CONTROLLER
WARNING APPARATUS
1312

F I G. 13B
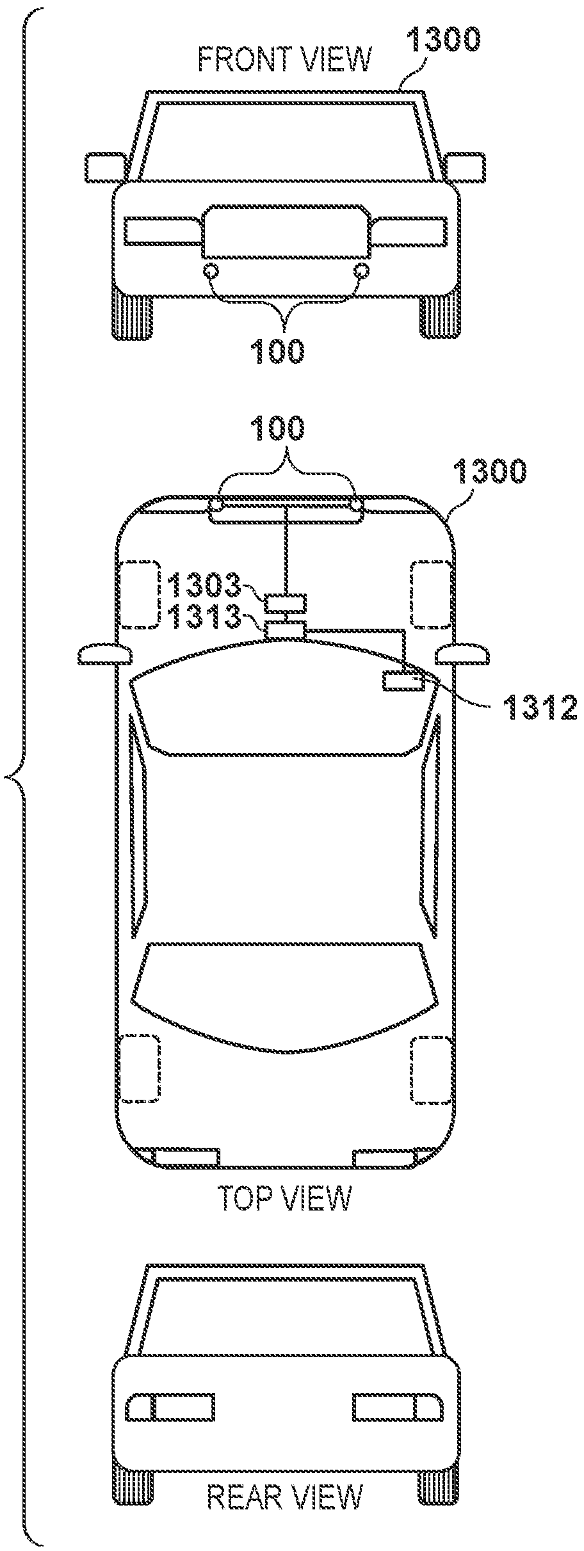

PHOTOELECTRIC CONVERSION APPARATUS, PHOTOELECTRIC CONVERSION SYSTEM, AND TRANSPORTATION EQUIPMENT

BACKGROUND

Technical Field

One disclosed aspect of the embodiments relates to a photoelectric conversion apparatus with a clipping circuit, a photoelectric conversion system, and a transportation equipment.

Description of the Related Art

When strong light is received as a spotlight in photoelectric conversion apparatuses, a luminance difference occurs around the spotlight due to an output electric potential difference between signal lines that are connected to pixels that received the light and signal lines that are connected to pixels that did not receive the light, and image quality may end up deteriorating in some cases. In Japanese Patent Laid-Open No. 2008-067344, it is described that a clipping circuit is connected to a vertical output line in order to limit, or clip, a range in which an electric potential of the vertical output line can change so that the electric potential of the vertical output line to which a signal is outputted from a pixel does not become lower than a predetermined voltage. Also, in Japanese Patent Laid-Open No. 2008-067344, it is indicated that a clipping circuit, which includes an amplification circuit for amplifying a signal based on the electric potential of the vertical output line, is used in order to improve clipping performance.

In the clipping circuit of Japanese Patent Laid-Open No. 2008-067344, the amplification circuit of the clipping circuit operates at all times while a signal is read out from a pixel. Also, an electric potential capable of being clipped by the clipping circuit is an electric potential at which a transistor, which is a current source load of the amplification circuit included in the clipping circuit, operates in a saturation region. Accordingly, a dynamic range of an electric potential of a vertical output line may end up being limited by the amplification circuit in some cases.

SUMMARY

Some embodiments provide a technique advantageous for expanding the dynamic range of photoelectric conversion apparatuses which use a clipping circuit including an amplification circuit.

According to some embodiments, a photoelectric conversion apparatus a plurality of pixels, a plurality of vertical output lines, a column readout circuit, a plurality of clippers, and a controller. The plurality of pixels are arranged in a plurality of rows and a plurality of columns A signal is outputted from the plurality of pixels to the plurality of vertical output lines. The signal outputted to the plurality of vertical output lines is read out to the column readout circuit. The plurality of clippers are configured to limit an electric potential of a corresponding vertical output line among the plurality of vertical output lines. Each of the plurality of clippers includes a first circuit configured to output an amplification signal that accords to a predetermined electric potential and the electric potential of the vertical output line and a second circuit configured to supply an electric current that accords to the amplification signal to the vertical output line. The controller controls each of the plurality of clippers to a predetermined state selected from a plurality of states including a first state in which a range in which the electric potential of the vertical output line can change is limited using the first circuit and the second circuit, and a second state in which the range in which the electric potential of the vertical output line can change is limited with an output of the second circuit deactivated.

Further features of the disclosure will become apparent from the following description of exemplary embodiments (with reference to the attached drawings).

BRIEF DESCRIPTION OF THE DRAWINGS

FIGS. 13A and 13B are diagrams for illustrating a configuration example of a transportation equipment including the photoelectric conversion system in which the image capturing apparatus in FIG. 1 is integrated.

DESCRIPTION OF THE EMBODIMENTS

Figure 1:
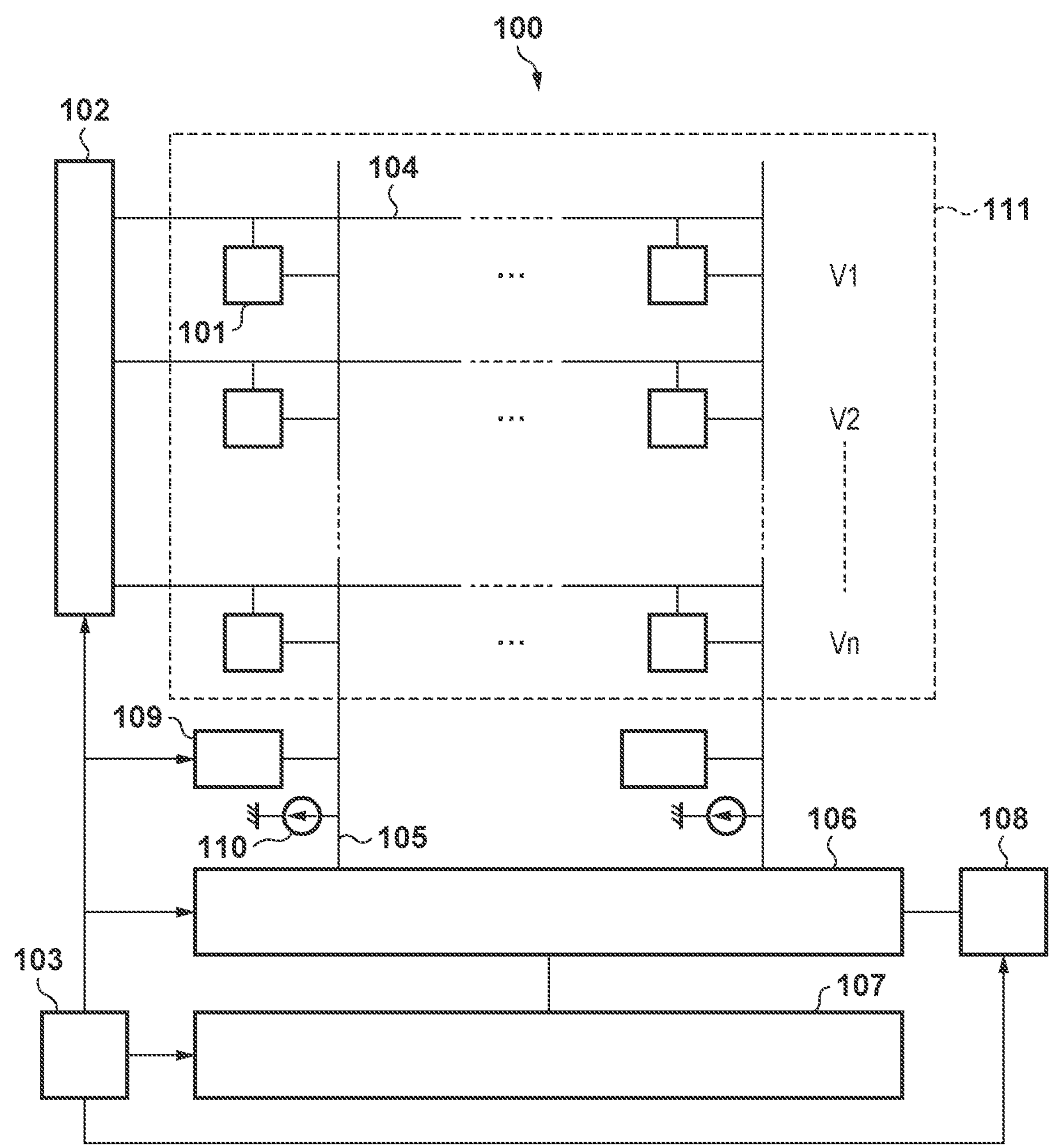
FIG. 1 is a block diagram for illustrating a configuration example of an image capturing apparatus in the present embodiment.

Hereinafter, embodiments will be described in detail with reference to the attached drawings. Note, the following embodiments are not intended to limit the scope of the disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

In each embodiment described below, an image capturing apparatus is described primarily as an example of a photoelectric conversion apparatus. However, each embodiment is not limited to the image capturing apparatus and may be adopted in other examples of the photoelectric conversion apparatus. For example, the photoelectric conversion apparatus may be a distance measurement apparatus (an apparatus for performing focus detection, distance measurement using TOF (Time Of Flight), and such), a photometric apparatus (an apparatus for performing measurement of amount of incident light and such), and such.

Referring to FIGS. 1 to 14, a configuration and operation of an image capturing apparatus 100, which is an example of the photoelectric conversion apparatus according to the embodiments of the present disclosure, is described. FIG. 1 is a block diagram for describing a configuration example of the image capturing apparatus 100 of the present embodiment. The image capturing apparatus 100 includes a plurality of pixels 101, a vertical scanning circuit 102, a controller 103, a control signal line 104, a vertical output line 105, a column readout circuit 106, a horizontal scanning circuit 107, an output circuit 108, and a clipper 109.

As illustrated in FIG. 1, the plurality of pixels 101 is arranged across a plurality of rows and a plurality of columns in a pixel region 111. In FIG. 1, the pixel region 111 including n rows of pixels 101 from a row V1 to a row Vn is illustrated. In the pixel region 111, an optical black pixel that is shielded from light, a dummy pixel that does not output a signal, a pixel for focus detection, and such may be arranged in addition to the pixels 101 for detecting an image capturing signal. The vertical scanning circuit 102 receives a control pulse from the controller 103 and then supplies a driving pulse for each row in relation to the pixels 101 arranged in a matrix. The control signal line 104 of each row is connected to the vertical scanning circuit 102. The control signal line 104 illustrated in FIG. 1 represents collectively a plurality of control signal lines for driving the pixels 101 described above. The vertical scanning circuit 102 supplies to the pixels 101 via the control signal line 104 a control signal for driving a readout circuit in the pixels 101 when reading out a signal from the pixels 101. A signal from the pixels 101 arranged in each column among the plurality of pixels 101 is outputted to the vertical output line 105. The column readout circuit 106 to which the signal outputted to the vertical output line 105 is read out is arranged at an end of the vertical output line 105 arranged for each column. Also, a current source load 110 is connected to the vertical output line 105 arranged for each column. The column readout circuit 106 may be a circuit for carrying out predetermined signal processing, for example, signal processing such as amplification processing and AD conversion processing in relation to the signal outputted from the pixels 101. The column readout circuit 106 may include a differential amplification circuit, a sample/hold circuit, an AD conversion circuit, and such. The horizontal scanning circuit 107 supplies to the column readout circuit 106 a control signal for transferring to the output circuit 108 in sequence for each column the signal processed in the column readout circuit 106. The output circuit 108 outputs the signal transferred from the column readout circuit 106 to a signal processor and such outside the image capturing apparatus 100. The output circuit 108 may have a signal processing function inside. The clipper 109, in the readout path described above, limits a range in which an electric potential of a corresponding (connected) vertical output line 105 among the plurality of the vertical output lines 105 can change. The controller 103 supplies a control signal for controlling operation or an operation timing of the image capturing apparatus 100 (of the vertical scanning circuit 102, the column readout circuit 106, the horizontal scanning circuit 107, the output circuit 108, the clipper 109 or the like). Here, although it is described that each configuration of the image capturing apparatus 100 is controlled by the controller 103, at least some control signals may be supplied from outside the image capturing apparatus 100.

Figure 2:
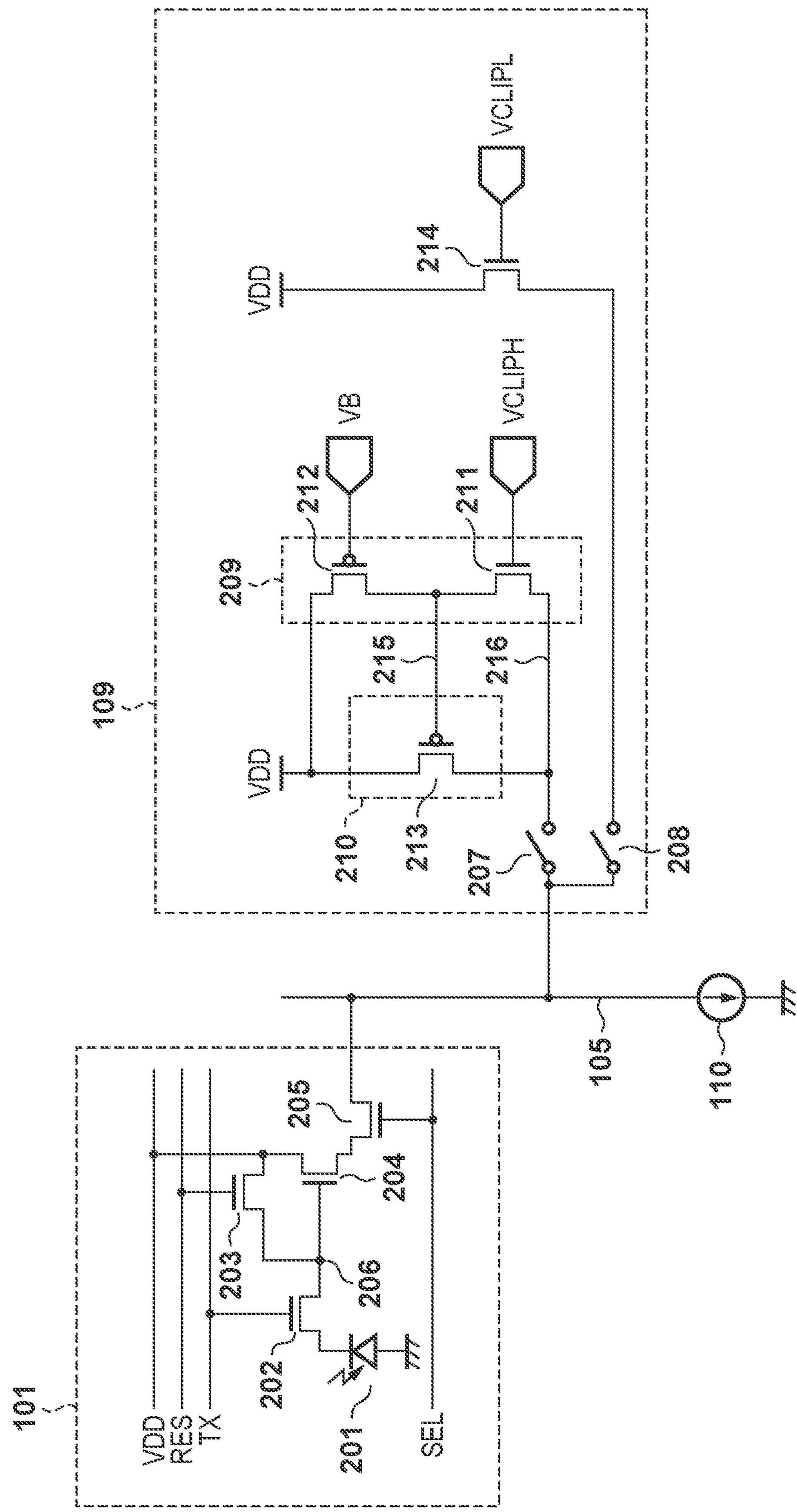
FIG. 2 is a diagram for illustrating a circuit configuration example of a pixel and a clipper of the image capturing apparatus in FIG. 1.

FIG. 2 is a diagram for illustrating a circuit configuration example of the pixel 101 and the clipper 109 of the image capturing apparatus 100. Although one pixel 101 is illustrated in FIG. 2 to be connected to the vertical output line 105, n pixels 101 may be connected to the vertical output line 105 as illustrated in FIG. 1. The pixel 101 includes a photodiode 201, a transfer transistor 202, a reset transistor 203, an amplification transistor 204, and a selection transistor 205. One (a drain) of primary terminals of the reset transistor 203 and the amplification transistor 204 is connected to a power source wiring line VDD. The transfer transistor 202 transfers a charge generated by the photodiode 201 which is a photoelectric converter to a floating diffusion 206 (hereinafter, represented as an FD 206 in some cases). The amplification transistor 204 outputs to the vertical output line 105 via the selection transistor 205 an output that accords to the FD 206. The amplification transistor 204 is a portion of a source follower circuit, and its control terminal (a gate) is connected with the PD 206. The reset transistor 203 resets to a predetermined electric potential (a reset potential) a node, in other words, the FD 206, to which the control terminal of the amplification transistor 204 is connected. The signal of the pixel 101 of a row selected by the vertical scanning circuit 102 is outputted to the vertical output line 105.

Next, the clipper 109 is described. The clipper 109 includes a circuit for outputting an amplification signal in accordance with a predetermined electric potential corresponding to the electric potential at which to clip the vertical output line 105 and the electric potential of the vertical output line 105, and a circuit for supplying to the vertical output line 105 an electric current that accords to the amplification signal. More specifically, the clipper 109 includes a common gate amplifier 209 which functions as a circuit for outputting the amplification signal that accords to a predetermined electric potential and an electric potential of the vertical output line 105. Also, the clipper 109 includes a common source amplifier 210 which functions as a circuit for supplying to the vertical output line 105 an electric current that accords to the amplification signal. The common gate amplifier 209 and the common source amplifier 210, although details are described below, function as a clipping circuit for limiting the range in which the electric potential of the vertical output line 105 can change. Also, in a configuration illustrated in FIG. 2, the clipper 109 further includes a transistor 214 to whose control terminal an electric potential VCLIPL is supplied and which functions as a clipping circuit for limiting the range in which the electric potential of the vertical output line 105 can change. Here, the transistor 214 is an n-type transistor, one of whose primary terminals is connected to the power source wiring line VDD and the other is connected to the vertical output line 105.

The common gate amplifier 209 includes a current source load 212 for supplying a predetermined electric current (e.g., a constant electric current) and a transistor 211, one of whose two primary terminals is connected to a node 215 connected to the current source load 212 and the other is connected to a node 216 connected to the vertical output line 105, and to whose control terminal a predetermined electric potential VCLIPH is supplied. Here, the transistor 211 is an n-type transistor. The common gate amplifier 209 outputs to the node 215 an electric potential that accords to a difference between the electric potential of the vertical output line 105 and the electric potential VCLIPH supplied to the control terminal of the transistor 211. In the present embodiment, the current source load 212 is configured by a load transistor, one of whose two primary terminals is connected to the power source wiring line VDD and the other connected to the node 215. Here, the load transistor of the current source load 212 is a p-type transistor.

The common source amplifier 210 includes a transistor 213, one of whose two primary terminals is connected to the power source wiring line VDD, the other connected to the node 216, and its control terminal connected to the node 215. The transistor 213 is a p-type transistor that shares the current source load 110 with the pixel 101 and is configured so as to limit, or clip, the range in which the electric potential of the vertical output line 105 can change. Here, a polarity of each transistor may be selected appropriately in accordance with a circuit configuration or a signal charge polarity (electrons in the present embodiment).

In the configuration illustrated in FIG. 2, the clipper 109 includes a switch 207 between the node 216, to which the common gate amplifier 209 and the common source amplifier 210 are connected, and the vertical output line 105. Also, the clipper 109 includes a switch 208 between the transistor 214, which functions as a clipping circuit, and the vertical output line 105.

Figure 3:
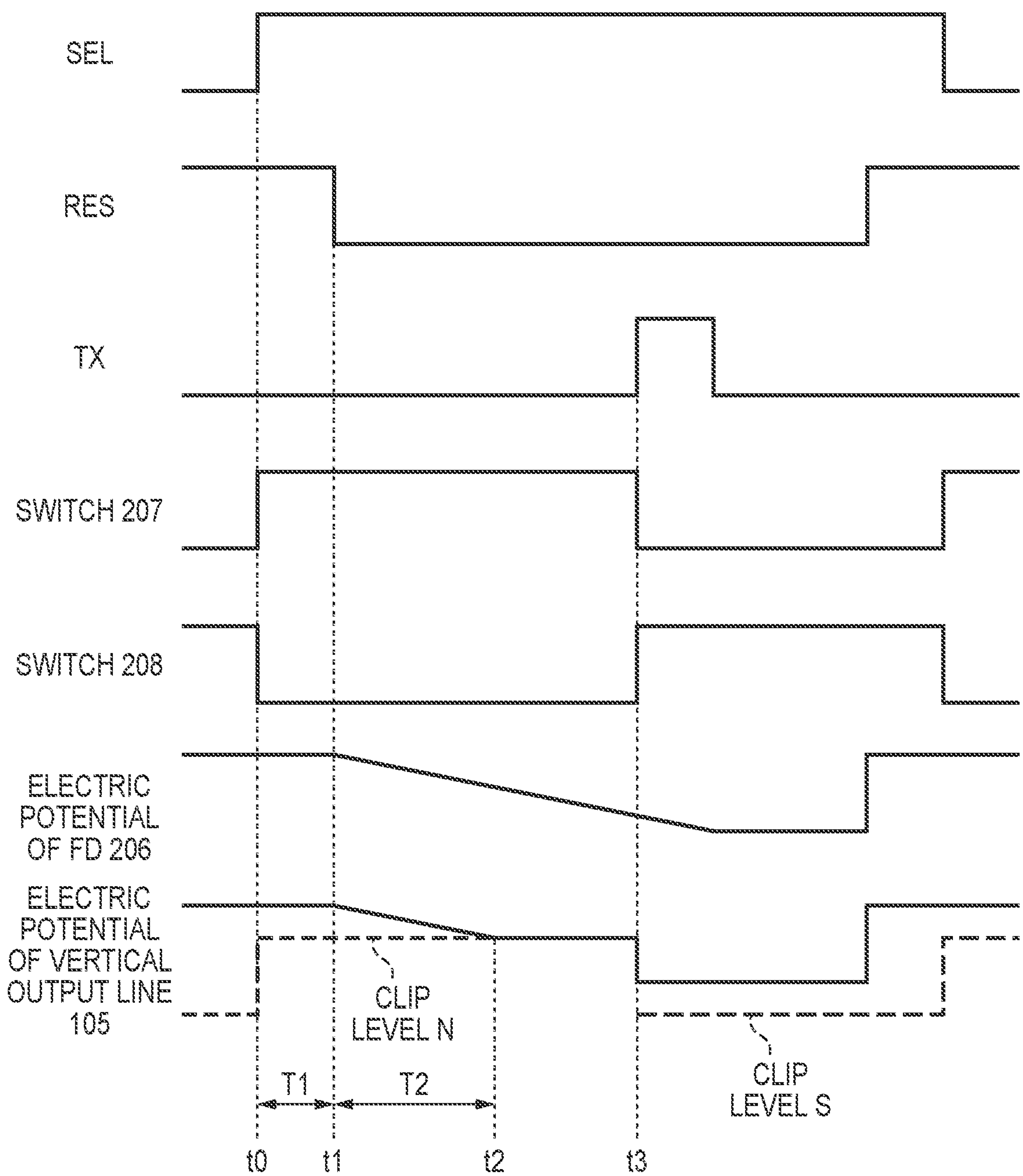
FIG. 3 is a timing chart for illustrating an operation example of the image capturing apparatus in FIG. 1.

Next, operation of the image capturing apparatus 100 of the present embodiment is described using FIG. 3. A pulse signal SEL becomes H (high) at a time t0, and then the selection transistor 205 enters an on state. At this time, because a pulse signal RES is H, the reset transistor 203 is in an on state. For this reason, the electric potential of the FD 206 which is an input unit of the amplification transistor 204 is a reset potential. During a period T1, the amplification transistor 204 operates to output to the vertical output line 105 the reset potential.

Next, the pulse signal RES becomes L (low) at a time t1, and then the reset transistor 203 enters an off state. During a period T2, similarly to the period T1, the amplification transistor 204 operates to output to the vertical output line 105 the reset potential. However, when strong light is incident on the pixel 101, because the electric potential of the FD 206 becomes lower due to a charge that overflowed from the photodiode 201, the amplification transistor 204 attempts to output to the vertical output line 105 a voltage that is lower than the normal reset level. Here, because the switch 207 is in an electricity conducting state, the transistor 211 of the common gate amplifier 209, to which the electric potential VCLIPH is being supplied to the gate, enters an on state, and then the electric potential of the node 215 becomes lower. When the electric potential of the node 215 becomes lower, the p-type transistor 213 of the common source amplifier 210 enters an on state. In other words, an electric potential, to which a positive gain is applied in relation to a change in the electric potential of the vertical output line 105, is supplied to the control terminal of the transistor 213. Therefore, the drain current of the transistor 213 rapidly increases in accordance with the electric potential of the vertical output line 105 becoming lower. The transistor 213 returns, to the primary terminal (source) connected to the node 216 of the transistor 211, a larger electric potential in a case where the amount of electric potential drop of the vertical output line 105 from the electric potential VCLIPH is larger than in a case where the amount of electric potential drop of the vertical output line 105 is smaller. Thereafter, at a time t2, a sum of electrical currents flowing across the current source load 212 and the common source amplifier 210 becomes equal to a value of the electric current flowing across the current source load 110 of the vertical output line 105, and then the electric potential of the vertical output line 105 becomes stable. In other words, a clip (clip level N) set by the electric potential VCLIPH is applied.

Here, the efficiency of the clipping operation is improved by setting the amount of electric current flowing across the common gate amplifier 209 to be smaller than the amount of electric current flowing across the current source load 110 in order to raise the gain of the common gate amplifier 209. Also, the efficiency of the clipping operation is improved by causing the electric current flowing across the common gate amplifier 209 to be smaller than the electric current flowing across the transistor 213. For this reason, transconductance of the common source amplifier 210 including the transistor 213 may be made to be larger than transconductance of the transistor 211 and the transistor of the current source load 212.

Next, when a pulse signal TX becomes H at a time t3 and then the transfer transistor 202 is turned on, the charge of the photodiode 201 is transferred to the FD 206, and then the amplification transistor 204 outputs to the vertical output line 105 an output (a signal potential) based on the electric potential of the FD 206. Also, the switch 207 ceases to conduct electricity at the time t3, and then the switch 208 starts to conduct electricity. By this, the electric potential of the vertical output line 105 becomes lower, and in a case it falls below a predetermined value, a clip (a clip level S) set by the electric potential VCLIPL is applied by the clipping circuit configured by the transistor 214. In other words, the electric potential VCLIPL is set to an electric potential lower than the electric potential VCLIPH.

By performing in order for each row the operation illustrated in FIG. 3, it is possible to read out to the column readout circuit 106 from the plurality of pixels 101 a signal for generating one image. As described above, in a period of a readout operation for reading out a signal for generating one image, the controller 103 controls the clipper 109 using the switch 207 to a predetermined state selected from a plurality of states including a first state where the range in which the electric potential of the vertical output line 105 can change is limited using the common gate amplifier 209 and the common source amplifier 210 and a second state where the output of the common source amplifier 210 is made inactive and the range in which the electric potential of the vertical output line 105 can change is limited. Here, the amplification signal, as described above, is a signal that accords to a predetermined electric potential (for example, the electric potential VCLIPH) corresponding to an electric potential at which to clip the vertical output line 105, and the electric potential of the vertical output line 105. Also, as described above, the clipper 109 limits the range in which the electric potential of the vertical output line 105 can change in both the first state and the second state. Also, in the readout operation period illustrated in FIG. 3, the image capturing apparatus 100 performs a reset readout operation (the time t0 to the time t3) for reading out a signal that accords to the charge of the PD 206 for when the FD 206 was reset and a signal readout operation (from the time t3 thereon) for reading out via the PD 206 the charge generated by the photodiode 201 which is a photoelectric converter. At this time, the controller 103, between the reset readout operation and the signal readout operation, switches to the first state or the second state the clipper 109. More specifically, the controller 103, in the reset readout operation, causes the clipper 109 to be in the first state in which the common gate amplifier 209 and the common source amplifier 210 are in an active state. Also, the controller 103, in the signal readout operation, causes the clipper 109 to be in the second state in which the output of the common source amplifier 210 is inactive.

Figure 4:
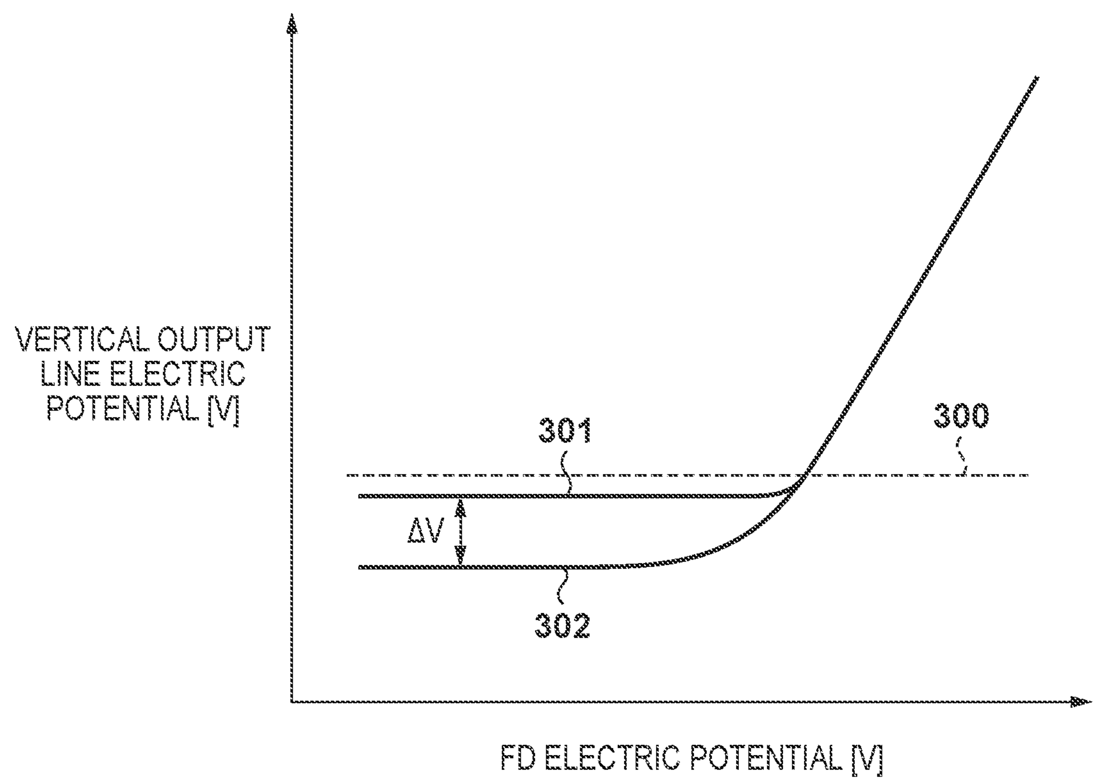
FIG. 4 is a graph for describing an electric potential change of a vertical output line of the image capturing apparatus in FIG. 1.

FIG. 4 describes an effect of causing the clipper 109 to be in the second state in the signal readout operation. FIG. 4 represents an electric potential change of the vertical output line 105 in relation to an electric potential change of the FD 206. FIG. 4 indicates that the clipping operation is different between the first state in which the common gate amplifier 209 and the common source amplifier 210 are used and the second state in which the output of the common source amplifier 210 is inactive. When the electric potential of the vertical output line 105 reaches a predetermined clipping potential 300 for clipping, the clipping circuit of the clipper 109 starts to operate. At this time, if the gain of the common gate amplifier 209 which functions as the clipping circuit is high, the clipping operation is performed simply by the electric potential of the vertical output line 105 becoming slightly lower in relation to the clipping potential 300, similarly to a curved line 301. By this, clipping performance can be increased.

Meanwhile, in a case where the gain is low (for example, in a case where the transistor 214 is used as the clipping circuit), the clipping performance becomes lower, and the switch is made gradually, similarly to a curved line 302. In other words, in a case where the gain is low, the lower limit of the electric potential of the vertical output line 105 changes by $\Delta V$.

The lower limit of the electric potential of the vertical output line 105 is decided in accordance with the electric potential at which the transistor of the current source load 110 operates in a saturation region, and it is necessary to set the clipping potential 300 so it does not become less than or equal to the electric potential where the transistor operates in the saturation region. However, consider a case where the clipping potential 300 is set to limit the range in which the electric potential of the vertical output line 105 can change at an electric potential just before where the transistor of the current source load 110 will operate in a saturation region. In such a case, the clipping potential may end up falling below the lower limit of the vertical output line 105 depending on variation in the voltage supplied, a pixel characteristic, or a characteristic of the clipping circuit. Therefore, in the present embodiment, in the signal readout operation for reading out the charge generated by the photodiode, the output of the common source amplifier 210 is made inactive in order to be in the second state, the clipping circuit configured by the common gate amplifier 209 and the common source amplifier 210 is not used, and the clipping circuit configured by the transistor 214 is used. By this, the clipping performance of the clipping circuit on the electric potential of the vertical output line 105 is lowered and clipping is caused to apply gradually. By this, it becomes possible to reduce an effect on an image quality due to the variation in the clipping operation of the clipper 109 for each column and to use broadly the dynamic range (the range in which change is possible) of the electric potential of the vertical output line 105 for when the image capturing signal is read out.

In the configuration of the clipper 109 illustrated in FIG. 2, the clipping circuit configured by the common gate amplifier 209 and the common source amplifier 210 enters an operation state by causing the switch 207 to conduct electricity, whereby the clipper 109 enters the first state. Also, the clipping circuit configured by the common gate amplifier 209 and the common source amplifier 210 enters a non-operation state by causing the switch 207 to not conduct electricity, whereby the clipper 109 enters the second state. However, no limitation is made to these, and the switching of the first state and the second state of the clipper 109 may be controlled by the amount of electric current flowing across the common gate amplifier 209. Regarding this, description is given later.

Also, a case where an amplification circuit and such are included in the column readout circuit 106 in a later stage of the vertical output line 105 may be considered. In such a case, instead of switching the clipper 109 to the first state or the second state between the reset readout operation and the signal readout operation as described above, it is possible to switch in accordance with a setting such as switching to the first state only when the gain of a later stage is high. In other words, the clipper 109, in a case where an amplification factor is, for example, 4×, may enter the first state and in a case where the amplification factor is 1× (which is smaller than 4×), may enter the second state in which the output of the common gate amplifier 209 is inactive. Also, although an external supply was illustrated as an example for the electric potential VCLIPH, an embodiment may be of a configuration in which the electric potential of the vertical output line 105 is inputted and is held in the transistor 211 and such.

Also, the electric potential of the clipper 109 for clipping the electric potential of the vertical output line is not limited to only two types. For example, the clipper 109 may further comprise a clipping circuit equivalent to the clipping circuit including the transistor 214. In such a case, by setting an electric potential inputted into the control terminal of the transistor to an electric potential other than the electric potentials VCLIPH or VCLIPL, the ranges in which the electric potential of the vertical output line 105 can change may be of three or more types. Also, for example, the clipper 109 may further comprise a circuit equivalent to the clipping circuit configured by the common gate amplifier 209 and the common source amplifier 210 and limit the electric potential of the vertical output line 105 to three or more types of ranges.

Figure 5:
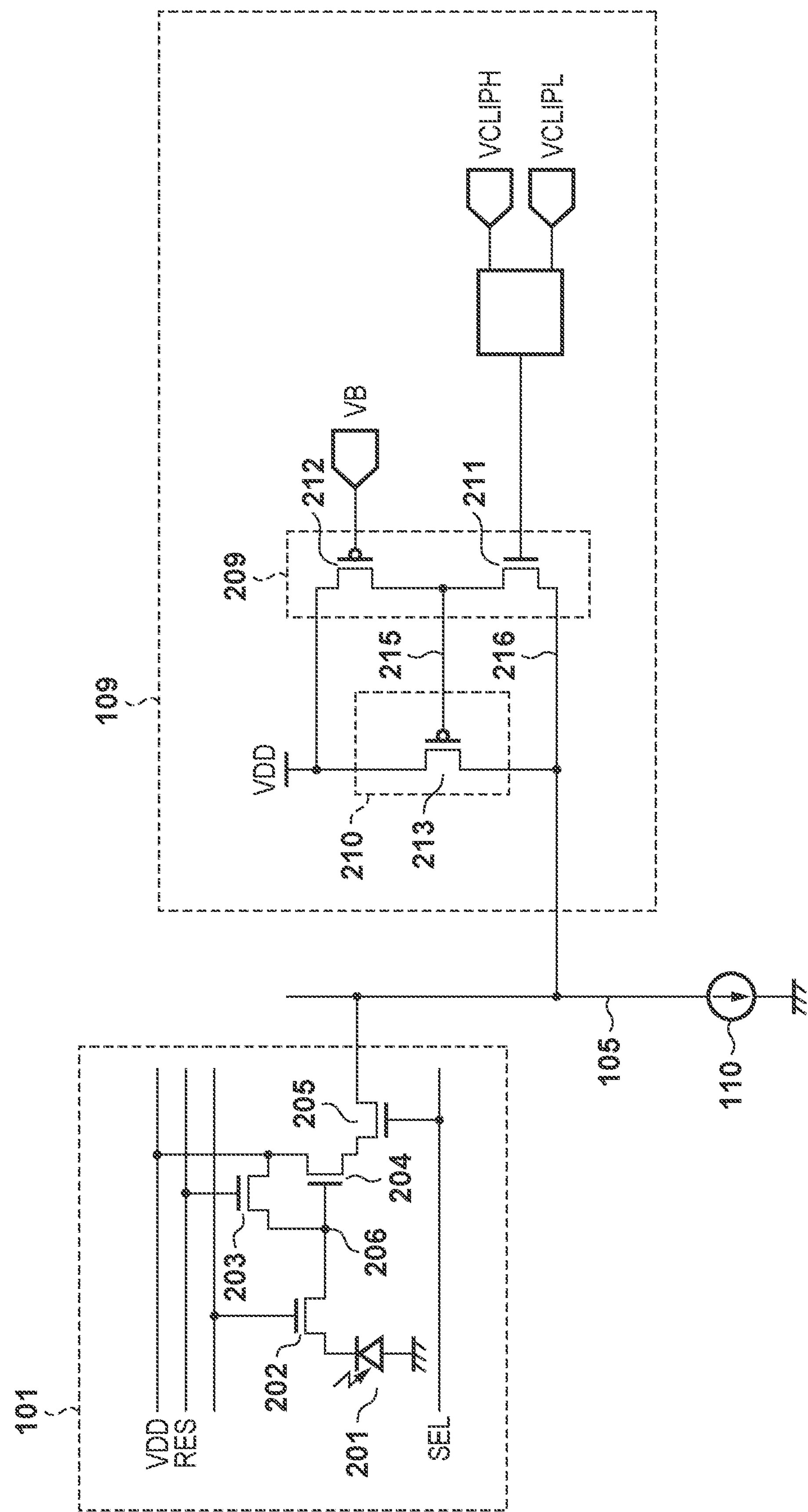
FIG. 5 is a diagram for illustrating a circuit configuration example of a pixel and a clipper of the image capturing apparatus in FIG. 1.

Next, FIG. 5 describes a variation of the configuration of the clipper 109 illustrated in FIG. 2. In the circuit configuration illustrated in FIG. 2 described above, in the first state, the common gate amplifier 209 and the common source amplifier 210 function as the clipping circuit for limiting the range in which the electric potential of the vertical output line 105 can change. Also, in the second state, the clipping circuit (the transistor 214) for limiting the range in which the electric potential of the vertical output line 105 can be changed is further arranged. Meanwhile, in the configuration illustrated in FIG. 5, in the first state, similarly to the configuration in FIG. 2 described above, the common gate amplifier 209 and the common source amplifier 210 function as the clipping circuit for limiting the range in which the electric potential of the vertical output line 105 can change. Meanwhile, in the second state, the output of the common source amplifier 210 is inactive, and the common gate amplifier 209 functions as the clipping circuit for limiting the electric potential of the vertical output line 105.

Figure 6:
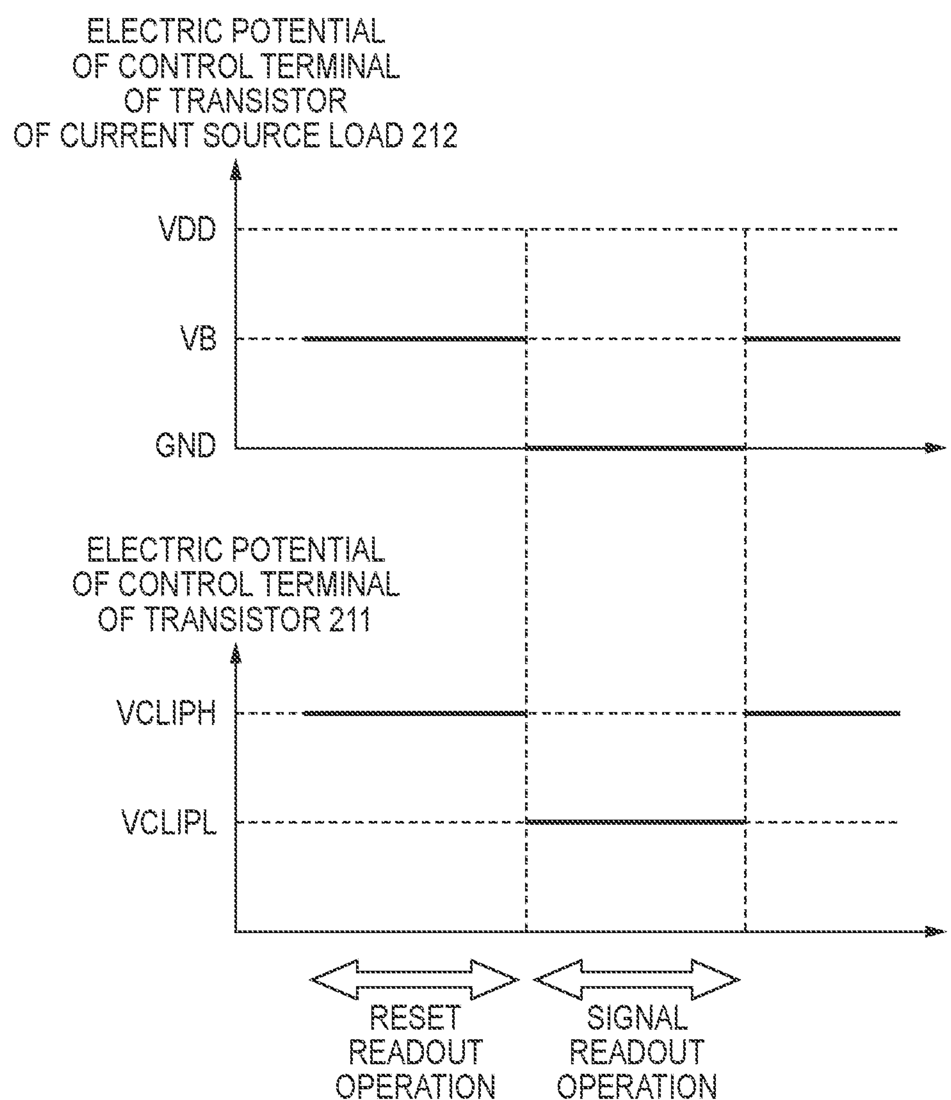
FIG. 6 is a timing chart for illustrating an operation example of the image capturing apparatus in FIG. 1.

In the configuration illustrated in FIG. 5, the electric potential VCLIPH and the electric potential VCLIPL are switched and supplied to the control terminal of the transistor 211 of the common gate amplifier 209 in the clipper 109. Also, as illustrated in FIG. 6, a voltage VB supplied to the control terminal of the transistor of the current source load 212 switches between the reset readout operation and the signal readout operation. In the reset readout operation for reading out the reset potential, the electric potential VCLIPH is supplied as a clipping potential to the transistor 211, and the voltage VB is supplied to the control terminal of the transistor of the current source load 212 in order for the current source load 212 to cause a predetermined electric current to flow. In other words, the controller 103 operates the transistor of the current source load 212 in a constant electric current mode for causing a predetermined electric current to flow. By this, similarly to the case in FIG. 2 described above, the clipper 109 enters the first state where the common gate amplifier 209 and the common source amplifier 210 limit the range in which the electric potential of the vertical output line 105 can change.

Meanwhile, in the signal readout operation for reading out the signal potential, the electric potential VCLIPL is supplied as the clipping potential to the transistor 211 and the GND potential is supplied to the control terminal of the transistor of the current source load 212. In other words, the current source load 212 causes the operation for causing the constant electric current to flow as the current source to be inactive. Also, by the GND potential being supplied to the control terminal of the transistor of the current source load 212, the transistor of the current source load 212 operates in an on mode in which the resistance value between the two primary terminals becomes smaller than that of the constant electric current mode. By this, the electric potential of the node 215 attains roughly the same electric potential as the power source wiring line VDD. As a result, the transistor of the common source amplifier 210 enters an off state. In other words, the output of the common source amplifier 210 becomes inactive. In such a case, the transistor 211 of the common gate amplifier 209 functions as a clipping circuit for limiting the range in which the electric potential of the vertical output line 105 can change. In other words, the controller 103 controls the electric potential of the control terminal of the transistor of the current source load 212 and then by controlling the electric potential of the node 215, the clipper 109 is controlled to be in the first state or the second state. The configuration illustrated in FIG. 5 is able to achieve the same effect as the configuration illustrated in FIG. 2 while the circuit scale is made smaller than the configuration illustrated in FIG. 2.

Figure 7:
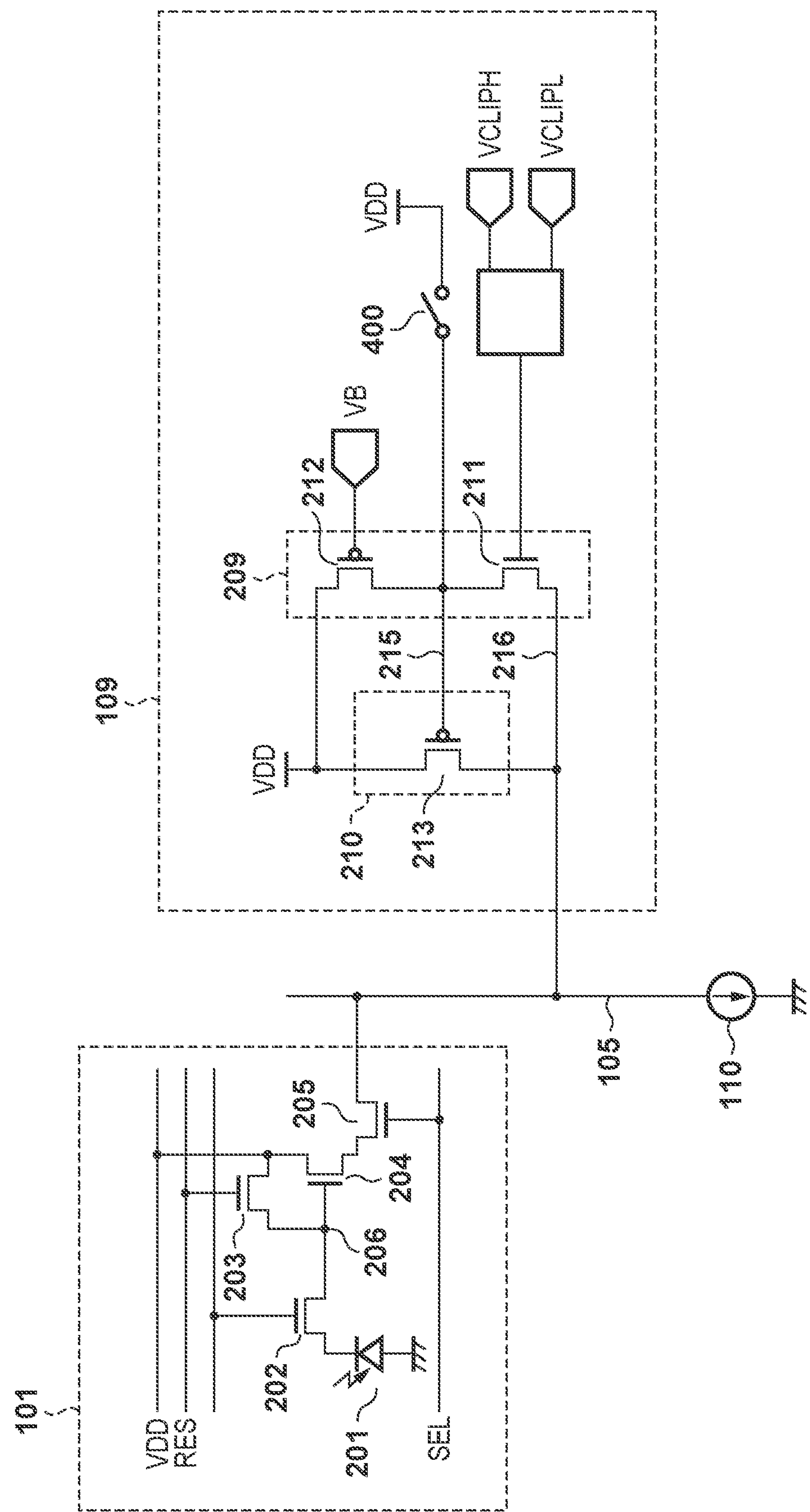
FIG. 7 is a diagram for illustrating a circuit configuration example of a pixel and a clipper of the image capturing apparatus in FIG. 1.

FIG. 7 is a variation of the configuration illustrated in FIG. 5 of the clipper 109. In the configuration illustrated in FIG. 7, the node 215 is connected via a switch 400 to the power source wiring line VDD in contrast to the clipper 109 illustrated in FIG. 5. By causing the switch 400 to not conduct electricity, similarly to the configuration illustrated in FIG. 5 described above, the transistor of the current source load 212 operates in the constant electric current mode, and the clipper 109 enters the first state. Also, by causing the switch 400 to conduct electricity, the electric potential of the node 215 attains roughly the same electric potential as the power source wiring line VDD, and the clipper 109 enters the second state. By this, it becomes possible to switch the clipper 109 to the first state or the second state only by operation of the switch 400 without changing the electric potential VB supplied to the control terminal of the transistor of the current source load 212. In other words, the operation of the clipper 109 is controlled between the first state and the second state by controlling the electric potential of the node 215.

Figure 8:
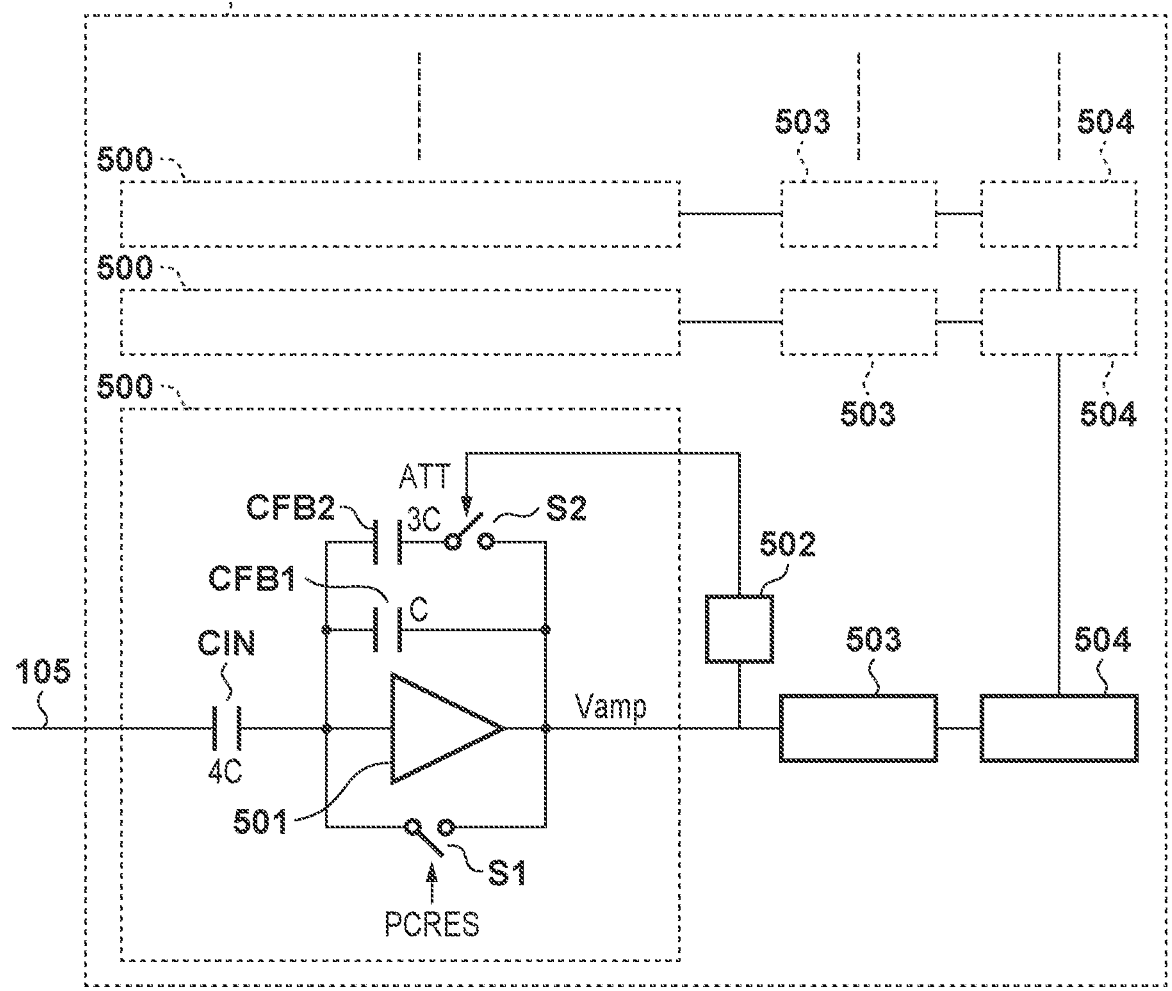
FIG. 8 is a diagram for illustrating a circuit configuration example of a column readout circuit of the image capturing apparatus in FIG. 1.

As described above, an amplification circuit may be arranged in the column readout circuit 106 in some cases. FIG. 8 illustrates an example of an amplification circuit 500 included in the column readout circuit 106. The amplification circuit 500 includes an inverting amplifier 501; capacitors CIN, CFB1, and CFB2; switches S1 and S2. The vertical output line 105 is connected via the capacitor CIN to the input terminal of the inverting amplifier 501. The switch S1, the capacitor CFB1, and the switch S2 and the capacitor CFB2 connected in series are connected in parallel between the input terminal and the output terminal of the inverting amplifier 501. The capacitor CFB1 acts as a feedback capacitor. On and off of the switch S2 is controlled by a setting signal ATT, and in a case of an H level, the switch S2 turns on, and then the capacitor CFB2 acts as a feedback capacitor. The switch S1 turns on in a case where a control signal PCRES sent from the controller 103 is an H level, and then the charge accumulated in the capacitors CFB1 and CFB2 is reset. As an example, capacitances of the capacitors CIN, CFB1, and CFB2 of the present embodiment are 4C, C, and 3C, respectively. Therefore, in a case where the switch S2 is off, the gain of the amplification circuit 500 is set to 4× and in a case where the switch S2 is on, the gain of the amplification circuit 500 is set to 1×. In other words, the amplification circuit 500 has a configuration in which the amplification factor can change.

The inverting amplifier 501 outputs as an amplification signal Vamp a signal obtained by amplifying a signal of the vertical output line 105 by a set gain. A determination circuit 502 is a circuit for determining the output level of the amplification signal Vamp and generating the setting signal ATT as an L level or an H level in accordance with that result. The amplification signal Vamp is transferred to the output circuit 108 via an AD converter 503 and a memory 504. Here, the capacitances of the capacitors CIN, CPB1, and CFB2 are set appropriately in accordance with a gain to be set for the amplification circuit 500.

Figure 9:
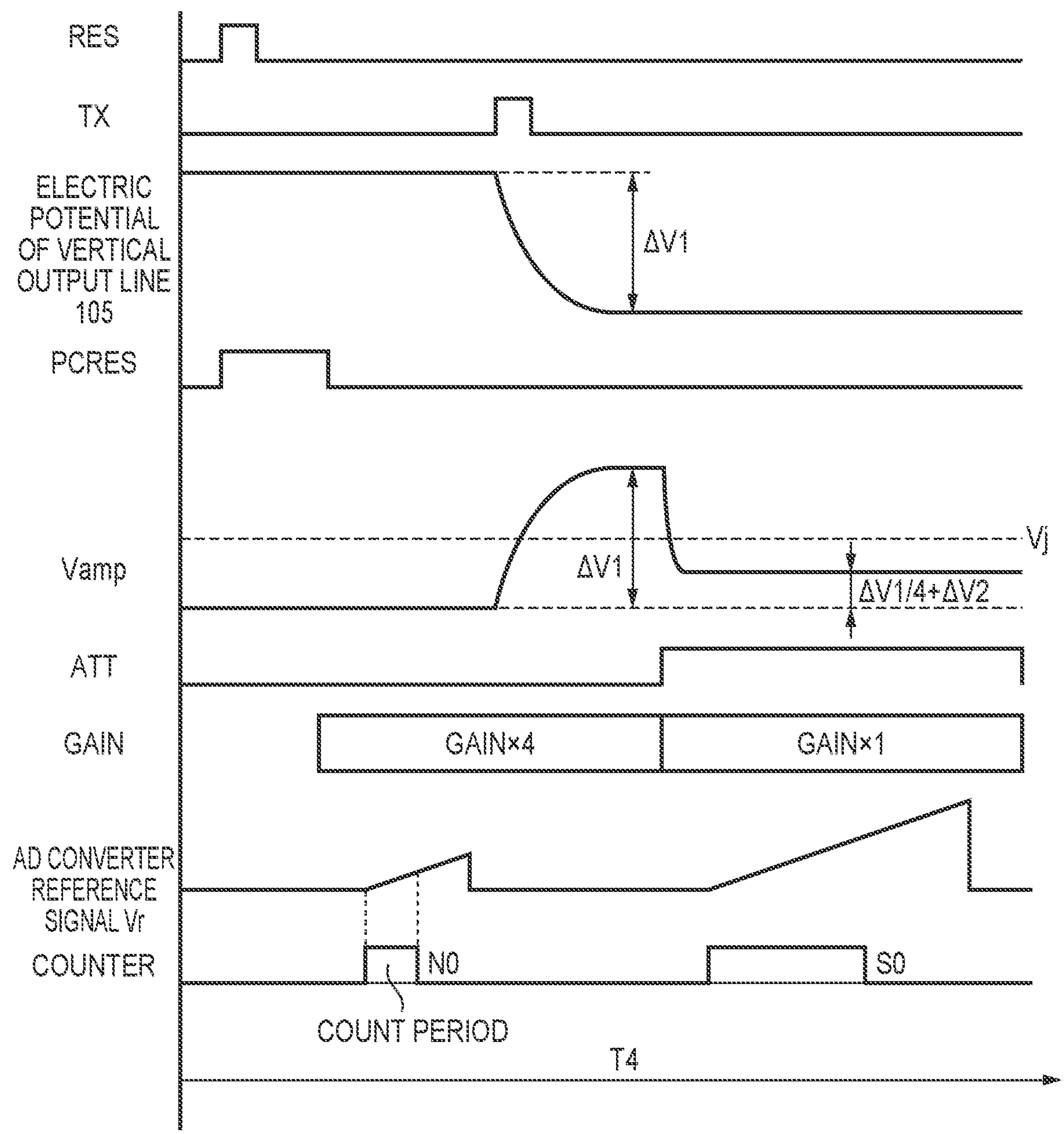
FIG. 9 is a timing chart for illustrating an operation example of an amplification circuit of the column readout circuit in FIG. 8.
Figure 10:
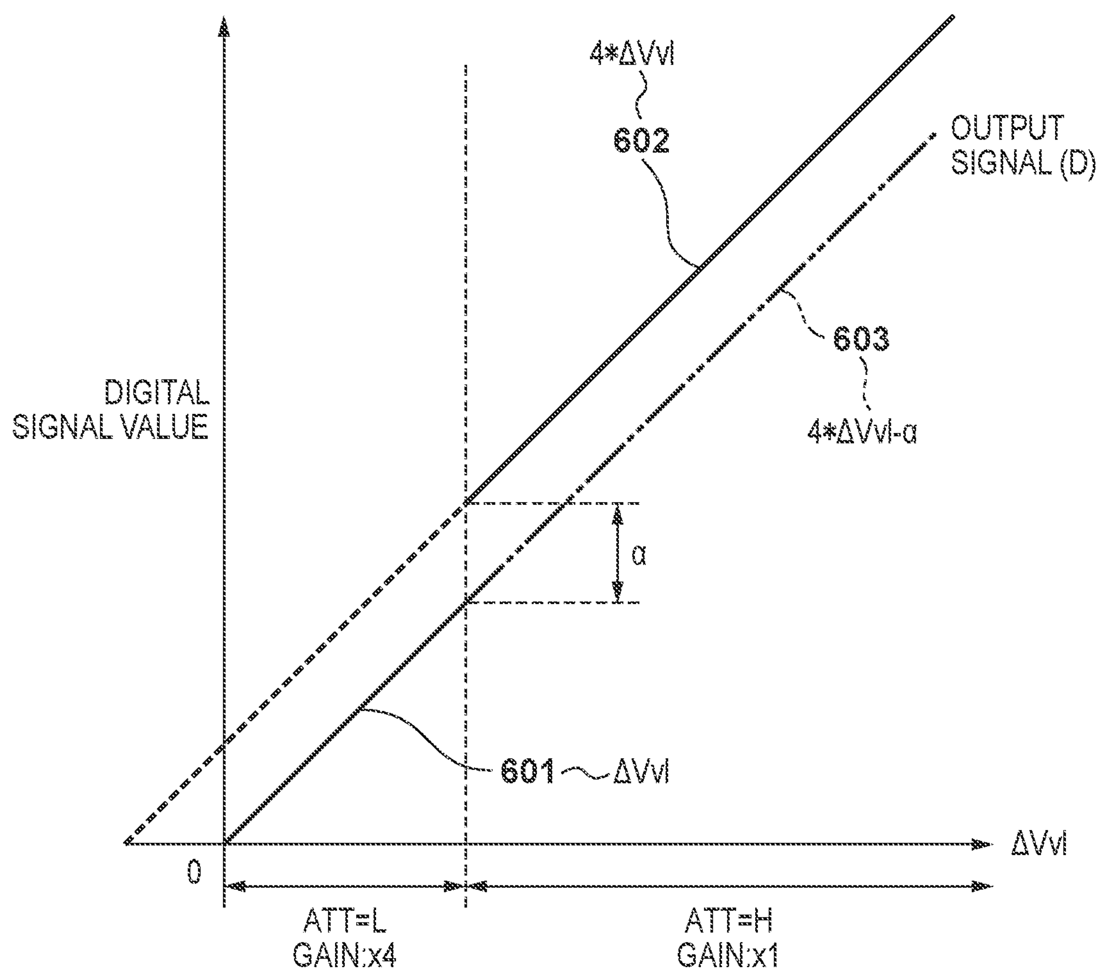
FIG. 10 is a graph for illustrating a relationship between an electric potential of the vertical output line and a digital output of the image capturing apparatus in FIG. 1.

The operation timing of the amplification circuit 500 is described using FIG. 9. The switch S2 of the amplification circuit 500 is off in an initial state, and a signal ΔVv1 outputted to the vertical output line 105 is outputted to the amplification signal Vamp as a signal ΔV1 in relation to a reference output level of the inverting amplifier 501. Next, the determination circuit 502, in a case where the signal ΔV1 of the amplification signal Vamp exceeds a predetermined determination value Vj, outputs an H level to the setting signal ATT at a time t4. Receiving that signal, the switch S2 turns on, and the gain of the amplification circuit 500 changes to 1×. A signal ΔV2 shown in FIG. 9 is a gain error and offset component of the amplification circuit 500. A relationship between digital signal values outputted from the vertical output line 105 and the image capturing apparatus 100 in a case where such an operation was performed is illustrated in FIG. 10. Here, the signal of the vertical output line 105 is ΔVv1. The signal ΔVv1 corresponds to the amount of light incident on the pixel 101. In a case the signal ΔVv1 of the vertical output line 105 is a value that accords to a signal for when the pixel 101 was reset, the signal ΔVv1 is, for example, zero. In a case the signal ΔVv1 is small, because the output of the amplification circuit 500 is smaller than the predetermined determination value Vj, the gain is 4×. In FIG. 10, this is indicated by a curved line 601. Meanwhile, in a case the signal ΔVv1 is large, and the output of the amplification circuit 500 exceeds the predetermined determination value Vj, the gain is 1×. A state where the output in the case of 1× gain is multiplied by 4 in the digital processing is indicated by a curved line 602. Originally, it is expected that the curved line 601 and the curved line 602 would attain a characteristic of a curved line 603, which is characterized in it connects at the point where the gain switches. However, the signal amplified by a 4× gain and the signal amplified by a 1× gain have a different offset from each other due to a feedthrough of the switch S2 caused by connecting the capacitor CFB2 and such. Therefore, as illustrated in FIG. 10, a shift of a occurs between the digital signal of the curved line 602 and the digital signal of the curved line 601 in the value of the signal ΔVv1 where the gain setting switches. Although the curved line 603 is represented as 4× in accordance with the theoretical value, a shift occurs regarding a gain component in relation to what is 4 times in accordance with the theoretical value.

Thus, in order to obtain a correction value for correcting the shift, a test signal is inputted into the vertical output line 105, and an output in relation to the test signal is obtained. By this, it becomes possible to obtain the correction value. As an example, a certain amplitude (a test signal 1) is inputted from outside the vertical output line 105, and then 4×(D1) and 1×(D2) outputs are acquired. Furthermore, 4×(D3) and 1×(D4) outputs are acquired similarly by a different amplitude (a test signal 2) from when D1 and D2 were acquired. In such a case, a relationship is similar to the following, and it becomes possible to obtain a correction value.

$$\alpha = D1 - \beta \times 4 \times D2 \quad \text{Offset Component}$$

$$\beta = (D3 - D1)/(4 \times (D4D2)) \quad \text{Gain Component}$$

If the dynamic range (the operation range) of the electric potential of the vertical output line 105 for when the test signal is inputted is equivalent to the operation range in which a signal is outputted from the pixel 101, the accuracy of the signal outputted from the image capturing apparatus 100 will become higher. For the test signal, by cutting off the output from the pixel 101 and inputting from the clipper 109, it possible to acquire the correction value without increasing the number of circuit elements.

Figure 11:
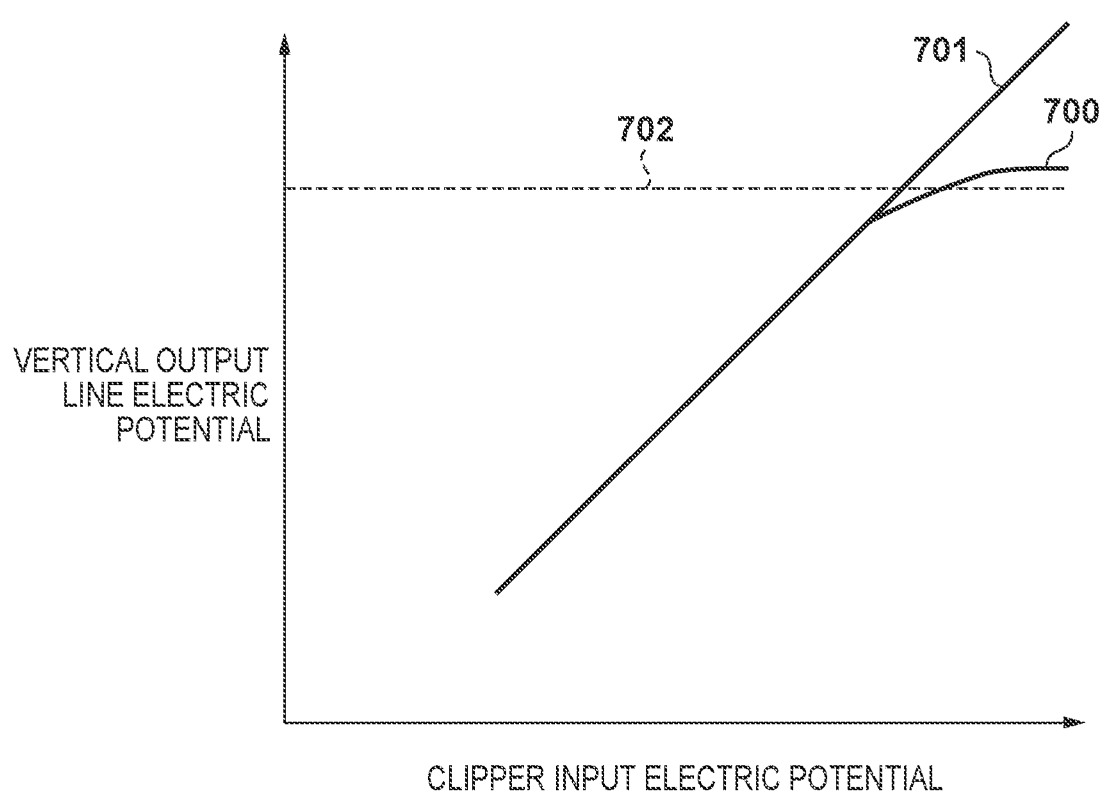
FIG. 11 is a graph for illustrating a relationship between a clip input voltage and the electric potential of the vertical output line of the image capturing apparatus in FIG. 1.

A relationship between an input electric potential of the clipper 109 and the electric potential of the vertical output line 105 in a case where such a test signal is supplied to the vertical output line 105 from the clipper 109 is illustrated in FIG. 11. A curved line 700 and a curved line 701 respectively indicate a characteristic of a case where the clipper 109 is in the first state described above and a case where the clipper 109 is in the second state. Also, an electric potential 702 indicates an electric potential of the reset level of the pixel 101. In a region where the input electric potential of the test signal from the clipper 109 is high, an output that accords to an output change of the transistor of the current source load 212 ceases, by the amount of the operating voltage of the current source load 212, to be outputted to the vertical output line 105. Meanwhile, because the clipper 109 is in the second state in the curved line 701, even in a case where the input electric potential of the test signal from the clipper 109 is high, an output without an electric potential drop is outputted to the vertical output line 105. As described above, by expanding the operation range of the vertical output line 105, it becomes possible to use an operation range equivalent to the original reset level of the pixel 101 to acquire the correction value of the amplification circuit 500. In other words, in order to perform the correction of the amplification circuit 500, the controller 103 of the image capturing apparatus 100 may set the clipper to the second state in the period for performing the correction operation for reading out to the column readout circuit 106 the test signal inputted to the vertical output line 105 without outputting a signal to the vertical output line 105 from each pixel of the plurality of pixels 101. Also, it is possible to update the correction value for each frame by performing this correction operation before outputting a signal from the pixels 101 and such.

A photoelectric conversion system such as a camera and a transportation equipment such as an automobile in which the image capturing apparatus 100 is integrated are exemplarily described below as application examples of the image capturing apparatus 100 according to the embodiment described above. Here, a concept of a camera includes not only apparatuses whose main purpose is shooting but also apparatuses (for example, mobile terminals such as a smartphone, a personal computer, and a tablet) secondarily comprising a shooting function.

Figure 12:
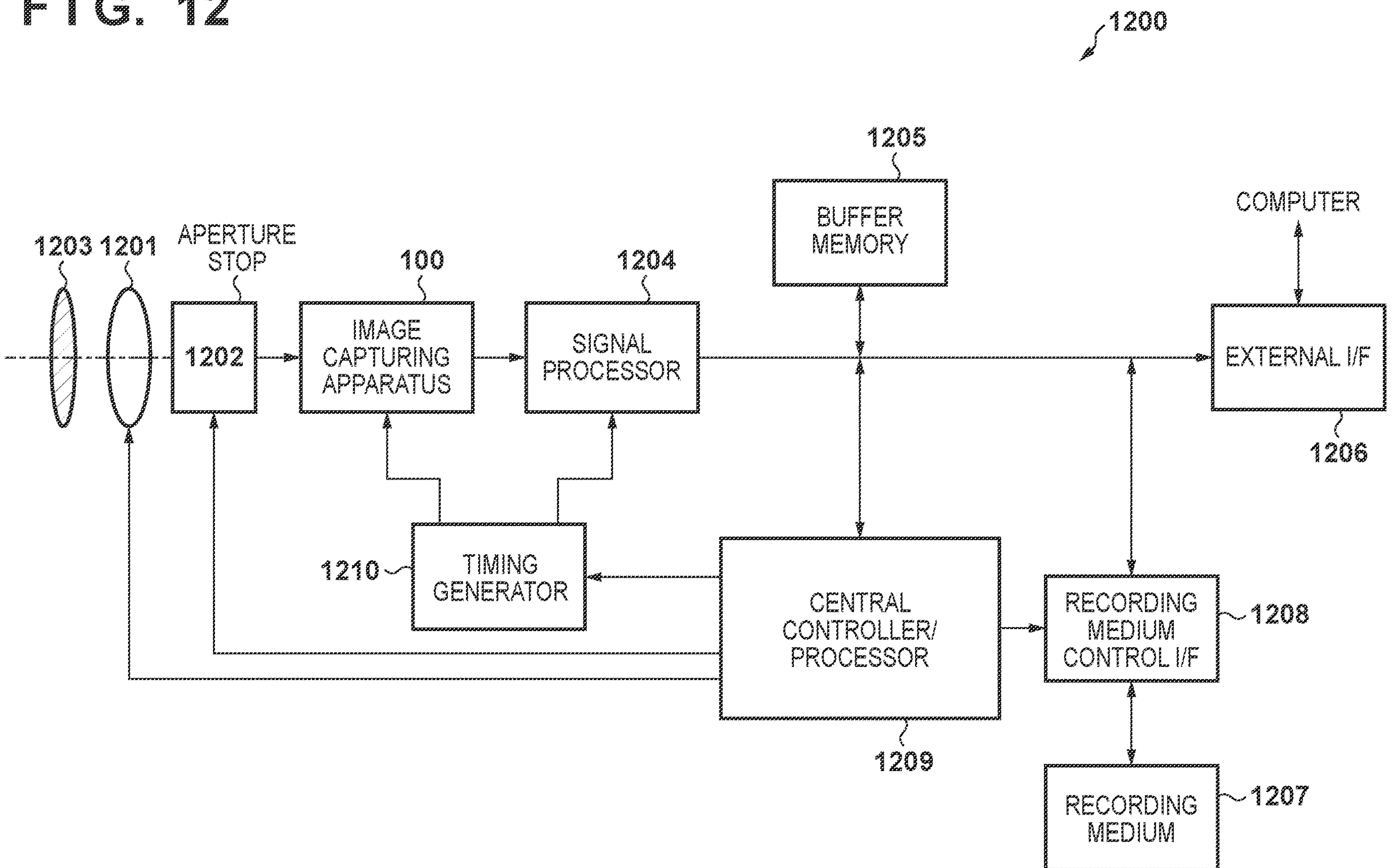
FIG. 12 is a diagram for illustrating a configuration example of a photoelectric conversion system in which the image capturing apparatus in FIG. 1 is integrated.

FIG. 12 is a block diagram for illustrating a configuration of a photoelectric conversion system 1200 in which the image capturing apparatus 100, which is an example of a photoelectric conversion apparatus, of the present embodiment is integrated. A digital still camera, a digital camcorder, a monitoring camera, and such are specific examples of the photoelectric conversion system 1200. A configuration example of a digital still camera in which the image capturing apparatus 100 described above is adopted is illustrated in FIG. 12.

The photoelectric conversion system 1200 exemplified in FIG. 12 has the image capturing apparatus 100, a lens 1201 for causing the image capturing apparatus 100 to image an optical image of a subject, an aperture stop 1202 for varying the amount of light which passes through the lens 1201, and a barrier 1203 for protecting the lens 1201. The lens 1201 (and the aperture stop 1202) is an optical system for focusing light into the image capturing apparatus 100 and forming an image on an imaging surface (a surface on which the pixels 101 are arranged) of the image capturing apparatus 100.

The photoelectric conversion system 1200 also has a signal processor 1204 for performing processing of a signal outputted from the image capturing apparatus 100. The signal processor 1204 performs as necessary each kind of correction and compression in relation to the signal inputted and then performs operation of processing of signals to be output. The signal processor 1204 may comprise a function for carrying out AD conversion processing in relation to the signal outputted from the image capturing apparatus 100. In such a case, it is not absolutely necessary to have an AD conversion circuit inside the image capturing apparatus 100.

The photoelectric conversion system 1200 further has a buffer memory 1205 for temporarily storing image data and an external interface (external I/F) 1206 for communicating with an external computer and such. Furthermore, the photoelectric conversion system 1200 has a recording medium 1207 such as a semiconductor memory for performing recording or read out of image capturing data and a recording medium control interface (a recording medium control I/F) 1208 for performing recording or read out to the recording medium 1207. Note that the recording medium 1207 may be integrated or be capable of attaching/detaching to/from the photoelectric conversion system 1200.

Furthermore, the photoelectric conversion system 1200 has a central controller/processor 1209 for performing each kind of calculation and for controlling the entirety of the digital still camera and a timing generator 1210 for outputting each type of timing signal to the image capturing apparatus 100 and the signal processor 1204. Here, timing signals and such may be inputted from the outside, and the photoelectric conversion system 1200 may have at least the image capturing apparatus 100, an optical system such as the lens 1201, and the signal processor 1204 for processing an output signal outputted from the image capturing apparatus 100. The central controller/processor 1209 and the timing generator 1210 may be configured so as to carry out a portion or the entirety of the control function of the image capturing apparatus 100.

The image capturing apparatus 100 outputs to the signal processor 1204 a signal for an image. The signal processor 1204 carries out predetermined signal processing in relation to the signal for an image outputted from the image capturing apparatus 100 and then outputs image data. Also, the signal processor 1204 uses the signal for an image and then generates an image.

It becomes possible to expand the dynamic range of the signal outputted to the vertical output line 105 from the pixel 101 by configuring the photoelectric conversion system using the image capturing apparatus 100 described above. By this, a photoelectric conversion system capable of acquiring a better quality image can be achieved.

Figure 14:
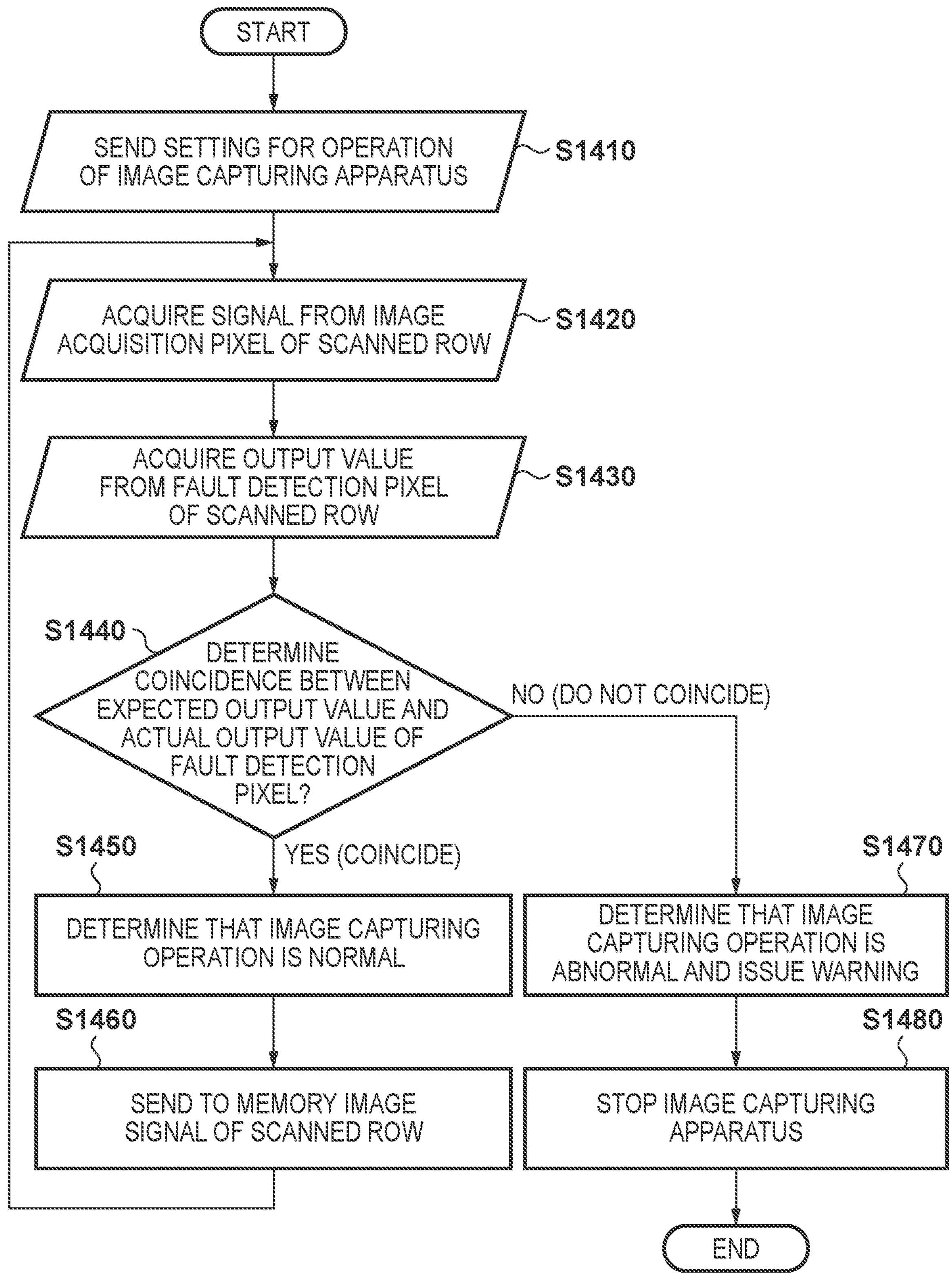
FIG. 14 is a flowchart for illustrating an operation example of the photoelectric conversion system in FIG. 13.

Also, a camera in which the image capturing apparatus 100 is integrated may be adopted in a monitoring camera; an in-vehicle camera mounted on a transportation equipment such as an automobile, an airplane, and a railroad vehicle; and such. Here, an example where a camera in which the image capturing apparatus 100 is integrated is adopted in a transportation equipment is described. A transportation equipment 1300 is, for example, an automobile comprising a photoelectric conversion system 1301 (an in-vehicle camera) illustrated in FIGS. 13A and 13B. FIG. 13A and FIG. 13B schematically illustrates the photoelectric conversion system 1301 and a main configuration example of the transportation equipment 1300, respectively. FIG. 14 is a flowchart illustrating the operation of the photoelectric conversion system 1301.

The photoelectric conversion system 1301 includes the image capturing apparatus 100, an image preprocessor 1315, an integrated circuit 1303, and an optical system 1314. The optical system 1314 forms an optical image of a subject in the image capturing apparatus 100. The image capturing apparatus 100 converts to an electrical signal the optical image of the subject formed by the optical system 1314. The image preprocessor 1315 performs predetermined signal processing in relation to a signal outputted from the image capturing apparatus 100. A function of the image preprocessor 1315 may be integrated in the image capturing apparatus 100. In the present embodiment, the optical system 1314, at least two sets of the image capturing apparatus 100 and the image preprocessor 1315 arranged in the photoelectric conversion system 1301, and an output from the image preprocessor 1315 of each set is inputted into the integrated circuit 1303.

The integrated circuit 1303 is an integrated circuit for the purpose of a photoelectric conversion system and includes an image processor 1304 including a memory 1305, an optical distance measure 1306, a parallax calculator 1307, an object recognizer 1308, and an abnormality detector 1309. The integrated circuit 1303 functions as a signal processor for processing the signal outputted from the image capturing apparatus 100. The image processor 1304 performs image processing such as developing processing and defect correction in relation to an output signal from the image preprocessor 1315. The memory 1305 is a primary storage of a captured image and stores a location of an image capturing pixel deficiency. The optical distance measure 1306 performs focusing on a subject and distance measurement. The parallax calculator 1307 performs a calculation of a parallax (a phase difference of a parallax image) from a plurality of image data acquired by a plurality of image capturing apparatuses 100. The object recognizer 1308 performs recognition of a subject such as a car, a road, a road sign, and a person. The abnormality detector 1309 notifies an abnormality to a main controller 1313 when an abnormality of the image capturing apparatus 100 is detected.

The integrated circuit 1303 may be achieved by hardware designed specifically, a software module, or a combination of these. It may also be achieved by an FPGA (Field Programmable Gate Array), an ASIC (Application Specific Integrated Circuit), and such, or a combination of these.

The main controller 1313 integrates/controls the operation of the photoelectric conversion system 1301, a vehicle sensor 1310, a controller 1320, and such. Note that a method may be taken where the photoelectric conversion system 1301, the vehicle sensor 1310, and the controller 1320 each has a communication interface without having the main controller 1313 and each perform transmission/reception of a control signal via a communication network (for example, a CAN standard).

The integrated circuit 1303 has a function to receive a control signal from the main controller 1313 or its own controller and then send a control signal or a setting value to the image capturing apparatus 100. For example, the integrated circuit 1303 sends to the image capturing apparatus 100 a setting and such for driving each configuration in the image capturing apparatus 100. According to this setting, the controller 103 of the image capturing apparatus 100 may operate each configuration element in the image capturing apparatus 100.

The photoelectric conversion system 1301 is connected to the vehicle sensor 1310 and is able to detect a driving state of the vehicle such as a vehicle speed, a yaw rate, and a steering angle as well as the environment outside the own vehicle and a state of other vehicles/obstacles. The vehicle sensor 1310 is also a distance information acquirer for acquiring distance information to the target object from a parallax image. Also, the photoelectric conversion system 1301 is connected to a driving assistance controller 1311 for performing a variety of driving assistance such as automatic steering, automatic cruise control, and an anti-collision function. Regarding a collision determination function in particular, collision prediction/collision presence or absence in relation to other vehicles/obstacles is determined based on a detection result of the photoelectric conversion system 1301 and the vehicle sensor 1310. By this, avoidance control in a case where collision is predicted and safety apparatus activation at the time of collision are performed.

Also, the photoelectric conversion system 1301 is connected to a warning apparatus 1312 for issuing a warning to a driver based on a determination result of the collision determination unit. For example, in a case where, as the determination result of the collision determination unit, a collision possibility is high, the main controller 1313 controls a driving apparatus of the transportation equipment 1300 such as braking, reverting the accelerator, suppressing an engine output in order to perform vehicle control for avoiding collision or reducing damage. The warning apparatus 1312 makes warning to a user by sounding a warning such as audio, displaying warning information on a display screen such as a car navigation system or a meter panel, giving a vibration to a seatbelt or the steering wheel, and such.

In the present embodiment, a surrounding, for example, front or rear, of an automobile is captured with the photoelectric conversion system 1301. In FIG. 13B, an arrangement example of the photoelectric conversion system 1301 in a case where the front of the automobile is captured with the photoelectric conversion system 1301 is illustrated.

Two image capturing apparatuses 100 are arranged in the front of the transportation equipment 1300. Specifically, a center line in relation to a forward/backward direction or an outer shape (for example, a vehicle width) of the transportation equipment 1300 is considered as a symmetrical axis, and the two image capturing apparatuses 100 are arranged symmetrically in relation to that symmetrical axis. Due to this arrangement, accuracy of determination may become higher in performing an acquisition of distance information between the transportation equipment 1300 and a target subject and determination of a collision possibility. Also, the image capturing apparatuses 100 may be in arrangements that do not obstruct the driver's field of view for when the driver visually confirms a situation outside the transportation equipment 1300 from the driver's seat. The warning apparatus 1312 may be in an arrangement that easily enters the driver's field of view.

Next, a fault detection operation of the image capturing apparatus 100 in the photoelectric conversion system 1301 is described using FIG. 14. The fault detection operation of the image capturing apparatus 100 is carried out in accordance with steps S1410 to S1480 illustrated in FIG. 14.

Step S1410 is a step for performing a setting for at a time of startup of the image capturing apparatus 100. In other words, a setting for the operation of the image capturing apparatus 100 is sent from outside the photoelectric conversion system 1301 (for example, the main controller 1313) or inside the photoelectric conversion system 1301, and an image capturing operation and the fault detection operation of the image capturing apparatus 100 are started.

Next, in step S1420, a pixel signal is acquired from effective pixels. Also, in step 1430, an output value from a fault detection pixel arranged for fault detection is acquired. This fault detection pixel comprises a photoelectric converter similarly to the effective pixel. A predetermined voltage is written to this photoelectric converter. The fault detection pixel outputs a signal corresponding to the voltage written to this photoelectric converter. Note that steps S1420 and S1430 may inverted.

Next, in step S1440, a determination on correspondence between an actual output value of the fault detection pixel and an expected output value of the fault detection pixel is performed.

In the case where the result of the correspondence determination in step S1440 is that the expected output value and the actual output value coincide, the processing transitions to step S1450, the image capturing operation is determined to have been performed normally, and then the processing transitions to step S1460. In step S1460, the pixel signal of a scanned row is sent to the memory 1305 and then is saved temporarily. Then, the processing returns to step S1420, and the fault detection operation is continued.

Meanwhile, in the case where the result of the correspondence determination in step S1440 is that the expected output value and the actual output value do not coincide, the processing transitions to step S1470. In step S1470, it is determined that there is an abnormality in the image capturing operation, and then a warning is issued to the main controller 1313 or the warning apparatus 1312. The warning apparatus 1312 causes a display to display that an abnormality was detected. Thereafter, the image capturing apparatus 100 is stopped in step S1480, and then the operation of the photoelectric conversion system 1301 is ended.

Note that although in the present embodiment, an example to cause the flowchart to loop for each row was illustrated, the flowchart may be looped for each plurality of rows or the fault detection operation may be performed for each frame.

Here, the issuance of the warning in step S1470 may be notified outside the vehicle via a wireless network.

Also, although in the present embodiment, control for not colliding with other vehicles and the fault detection operation were described, it is possible to adopt the disclosure in control for automated driving following another vehicle, control for automated driving as not to go out of a traffic lane, and such. Furthermore, the photoelectric conversion system 1301 may be adopted not only in vehicles such as an automobile but also mobile bodies (driving apparatuses), for example, a ship, an airplane, an industrial robot, and such. Additionally, it is possible to adopt the disclosure broadly not only in mobile bodies but also in devices which use object recognition such as an intelligent transport system (ITS).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-217502, filed Nov. 29, 2019, which is hereby incorporated by reference herein in its entirety.

What is claimed is:

1. A photoelectric conversion apparatus comprising:
- a plurality of pixels arranged in a plurality of rows and a plurality of columns;
- a plurality of vertical output lines to which signals are outputted from the plurality of pixels;
- a column readout circuit configured to read out the signals from the plurality of pixels via the plurality of vertical output lines;
- a plurality of clippers configured to limit an electric potential of a corresponding vertical output line among the plurality of vertical output lines; and
- a controller,
- wherein each of the plurality of clippers comprises a first circuit configured to generate a signal that accords to a predetermined electric potential and the electric potential of the vertical output line and a second circuit configured to supply an electric current that accords to the signal generated by the first circuit to the vertical output line, and
- the controller is configured to control each of the plurality of clippers to a state selected from a plurality of states including:
  - a first state in which a range in which the electric potential of the vertical output line can change is limited by the first circuit and the second circuit; and
  - a second state in which each of the plurality of clippers functions as a clipping circuit that limits the range in which the electric potential of the vertical output line can change while the second circuit is deactivated.

2. The photoelectric conversion apparatus according to claim 1, wherein
- each of the plurality of pixels comprises a photoelectric converter and a floating diffusion to which a charge generated in the photoelectric converter is transferred,
- the photoelectric conversion apparatus, in a period of a readout operation in which the column readout circuit reads out the signals from the plurality of pixels, performs a reset readout operation for reading out a signal that accords to a charge of the floating diffusion when the floating diffusion is reset and a signal readout operation for reading out a charge generated in the photoelectric converter via the floating diffusion, and the controller is configured to switch to the first state or the second state each of the plurality of clippers between the reset readout operation and the signal readout operation.

3. The photoelectric conversion apparatus according to claim 2, wherein the controller is configured to, in the reset readout operation, set each of the plurality of clippers to the first state, and in the signal readout operation, set each of the plurality of clippers to the second state.

4. The photoelectric conversion apparatus according to claim 1, wherein the column readout circuit comprises an amplification circuit for amplifying the signal outputted to each of the plurality of vertical output lines, the amplification circuit comprises a configuration in which an amplification factor can change, and the controller controls to the first state or the second state each of the plurality of clippers in accordance with the amplification factor.

5. The photoelectric conversion apparatus according to claim 4, wherein the controller, in a case where the amplification factor is a first amplification factor, sets each of the plurality of clippers to the first state, and in a case where the amplification factor is a second amplification factor which is smaller than the first amplification factor, sets each of the plurality of clippers to the second state.

6. The photoelectric conversion apparatus according to claim 1, wherein the column readout circuit comprises an amplification circuit for amplifying the signal outputted to each of the plurality of vertical output lines, the amplification circuit comprises a configuration in which an amplification factor can change.

7. The photoelectric conversion apparatus according to claim 4, wherein in order to perform a correction of the amplification circuit, the photoelectric conversion apparatus, without outputting the signal to the vertical output line from the plurality of pixels, further performs a correction operation for reading out to the column readout circuit a test signal inputted into the vertical output line, and the controller, in a period in which the correction operation is performed, sets each of the plurality of clippers to the second state.

8. The photoelectric conversion apparatus according to claim 7, wherein the test signal is inputted from each of the plurality of clippers.

9. The photoelectric conversion apparatus according to claim 1, wherein the first circuit and the second circuit, in the first state, function as a first clipping circuit for limiting the electric potential of the vertical output line, and each of the plurality of clippers further comprises a second clipping circuit for limiting the electric potential of the vertical output line in the second state.

10. The photoelectric conversion apparatus according to claim 9, wherein the first circuit comprises a common gate amplifier, the common gate amplifier comprises a current source load for causing a predetermined electric current to flow and a transistor, one of whose two primary terminals is connected to a first node connected to the current source load and the other is connected to a second node connected to the vertical output line and to whose control terminal the predetermined electric potential is applied, the second circuit comprises a common source amplifier, the common source amplifier comprises a transistor, one of whose two primary terminals is connected to a power source wiring line, the other is connected to the second node, and whose control terminal is connected to the first node, each of the plurality of clippers comprises a switch between the vertical output line and the second node, and the controller, by causing the switch to conduct electricity, enters the first state, and by causing the switch to not conduct electricity, enters the second state.

11. The photoelectric conversion apparatus according to claim 1, wherein in the first state, the first circuit and the second circuit function as a clipping circuit for limiting the electric potential of the vertical output line, and in the second state, the first circuit functions as the clipping circuit for limiting the electric potential of the vertical output line.

12. The photoelectric conversion apparatus according to claim 11, wherein the first circuit comprises a common gate amplifier, the common gate amplifier comprises a current source load for causing a predetermined electric current to flow and a transistor, one of whose two primary terminals is connected to a first node connected to the current source load and the other is connected to a second node connected to the vertical output line and to whose control terminal the predetermined electric potential is applied, the second circuit comprises a common source amplifier, and the common source amplifier comprises a transistor, one of whose two primary terminals is connected to a power source wiring line, the other is connected to the second node, and whose control terminal is connected to the first node.

13. The photoelectric conversion apparatus according to claim 12, wherein each of the plurality of clippers, by the controller controlling the electric potential of the first node, is controlled to the first state or the second state.

14. The photoelectric conversion apparatus according to claim 13, wherein the current source load comprises a load transistor, one of whose two primary terminals is connected to the power source wiring line and the other is connected to the first node, and the controller controls an electric potential of the first node by controlling an electric potential of the control terminal of the load transistor.

15. The photoelectric conversion apparatus according to claim 14, wherein
 the controller,
 by causing the load transistor to operate in a constant electric current mode in which the predetermined electric current is caused to flow, enters the first state, and
 by causing the load transistor to operate in an on mode in which a resistance value between the two primary terminals of the load transistor is smaller than that of the constant electric current mode, enters the second state.

16. The photoelectric conversion apparatus according to claim 13, wherein
 the first node is connected via a switch to the power source wiring line, and
 the controller,
 by causing the switch to not conduct electricity, enters the first state, and
 by causing the switch to conduct electricity, enters the second state.

17. The photoelectric conversion apparatus according to claim 1, wherein the predetermined electric potential is an electric potential different in the first state and the second state.

18. The photoelectric conversion system comprising:
 the photoelectric conversion apparatus according to claim 1;
 an optical system configured to form an image on an imaging surface of the photoelectric conversion apparatus; and
 a signal processor configured to process a signal outputted from the photoelectric conversion apparatus.

19. A transportation equipment that is equipped with a driving apparatus, the transportation equipment provided with the photoelectric conversion apparatus according to claim 1, and the transportation equipment comprising a control apparatus configured to control the driving apparatus based on information obtained by the photoelectric conversion apparatus.

20. A photoelectric conversion apparatus comprising:
 a plurality of pixels arranged in a plurality of rows and a plurality of columns;
 a plurality of vertical output lines to which signals are outputted from the plurality of pixels;
 a column readout circuit configured to readout the signals from the plurality of pixels via the plurality of vertical output lines;
 a plurality of clippers configured to limit an electric potential of a corresponding vertical output line among the plurality of vertical output lines; and
 a controller,
 wherein each of the plurality of clippers comprises a first circuit configured to generate a signal that accords to a predetermined electric potential and the electric potential of the vertical output line and a second circuit configured to supply an electric current that accords to the signal generated by the first circuit to the vertical output line, and
 the controller is configured to control each of the plurality of clippers to a state selected from a plurality of states including:
 a first state in which a range in which the electric potential of the vertical output line can change is limited by the first circuit and the second circuit; and
 a second state in which the range in which the electric potential of the vertical output line can change is limited with an output of the second circuit deactivated,
 wherein each of the plurality of pixels comprises a photoelectric converter and a floating diffusion to which a charge generated in the photoelectric converter is transferred,
 the photoelectric conversion apparatus, in a period of a readout operation in which the column readout circuit reads out the signals from the plurality of pixels, performs a reset readout operation for reading out a signal that accords to a charge of the floating diffusion when the floating diffusion is reset and a signal readout operation for reading out a charge generated in the photoelectric converter via the floating diffusion, and
 the controller is configured to switch to the first state or the second state each of the plurality of clippers between the reset readout operation and the signal readout operation.

* * * * *